US 6,496,934 B2

(12) United States Patent
Suzuki et al.

(10) Patent No.: US 6,496,934 B2
(45) Date of Patent: *Dec. 17, 2002

(54) DATA TRANSFER CONTROLLER, MICROCOMPUTER AND DATA PROCESSING SYSTEM

(75) Inventors: Takaaki Suzuki, Higashimurayama (JP); Tomoya Takasuga, Kodaira (JP); Norio Nakagawa, Tokyo (JP)

(73) Assignees: Hitachi, Ltd., Tokyo (JP); Hitachi ULSI Engineering Corp., Kodaira (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/727,453

(22) Filed: Dec. 4, 2000

(65) Prior Publication Data

US 2001/0000084 A1 Mar. 29, 2001

Related U.S. Application Data

(63) Continuation of application No. 09/061,128, filed on Apr. 16, 1998, now Pat. No. 6,202,154.

(30) Foreign Application Priority Data

Apr. 16, 1997 (JP) .............................................. 9-98602

(51) Int. Cl.[7] ............................................ G06F 12/14
(52) U.S. Cl. ...................................... 713/200; 711/163
(58) Field of Search ........................... 713/200; 711/163, 711/164; 710/22, 26, 28

(56) References Cited

U.S. PATENT DOCUMENTS 3,810,101 A 5/1974 Avery ...................... 340/172.5

| 5,379,394 A | 1/1995 | Goto ............................. 395/425 |
| 5,546,561 A | 8/1996 | Kynett et al. ................ 711/163 |
| 5,857,114 A | 1/1999 | Kim .............................. 395/842 |
| 5,963,980 A | 10/1999 | Coulier et al. ............... 711/163 |
| 6,049,876 A | 4/2000 | Moughanni et al. ......... 713/200 |
| 6,101,586 A | 8/2000 | Ishimoto et al. ............. 711/163 |
| 6,108,235 A | 8/2000 | Honma ................... 365/185.11 |
| 6,202,154 B1 * | 3/2001 | Suzuki et al. ................ 713/200 |

FOREIGN PATENT DOCUMENTS

| EP | 0859319 | 8/1998 |
| JP | 62191950 | 8/1987 |
| JP | 1250162 | 10/1989 |
| JP | 2297235 | 12/1990 |
| JP | 62191950 | 4/1994 |
| JP | 6266648 | 9/1994 |
| JP | 10228421 | 8/1998 |

* cited by examiner

Primary Examiner—Norman M. Wright
Assistant Examiner—Christopher Revak
(74) Attorney, Agent, or Firm—Antonelli, Terry, Stout & Kraus, LLP

(57) ABSTRACT

A combination mode a data transfer for a transfer source and a transfer destination is previously defined by a value of resource select information of a control register (CHCRn). An address comparator circuit (SACn, DACn) has judging logic specified by the defined contents and detects, depending on its logical structure, a data transfer address error in the a data transfer controller (8) on the basis of such logical structure, in accordance with resource select information and the transfer source address and transfer destination address of the address registers (SARn, DARn). Since the data transfer is started only when the resource select information matches with the setting information of both address registers, high reliability can be assured for memory protection in the data transfer operation by the data transfer controller.

5 Claims, 22 Drawing Sheets

FIG. 4

CHANNEL CONTROL REGISTER CHCR0 ~ CHCR3 (CHCRn)

| BIT: | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| | — | — | — | — | — | — | — | — | — | — | — | — | DS | RL | AN | AL |
| INITIAL VALUE: | | 0 | 0 | 0 | 0 | 0 | 0 | 0 | 0 | 0 | 0 | 0 | 0 | 0 | 0 | 0 |
| R/W: | | R | R | R | R | R | R | R | R | R | R | R | (R/W) | (R/W) | (R/W) | (R/W) |

| BIT: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | DM1 | DM0 | SM1 | SM0 | RS3 | RS2 | RS1 | RS0 | TM | TS2 | TS1 | TS0 | — | IE | TE | DE |
| INITIAL VALUE: | 0 | 0 | 0 | 0 | 0 | 0 | 0 | 0 | 0 | 0 | 0 | 0 | | 0 | 0 | 0 |
| R/W: | R/W | R/W | R/W | R/W | R/W | R/W | R/W | R/W | R/W | R/W | R/W | R/W | R | R/W | R/(W) | R/W |

FIG. 5

CHANNEL ENABLE BIT (DE)

| DE | EXPLANATION |
|---|---|
| 0 | PROHIBITING THE OPERATION OF CORRESPONDING CHANNEL (INITIAL VALUE) |
| 1 | ALLOWING THE OPERATION OF CORRESPONDING CHANNEL |

FIG. 6

RESOURCE SELECTING INFORMATION (RS3, RS2, RS1, RS0)

| RS3 | RS2 | RS1 | RS0 | EXPLANATION |
|---|---|---|---|---|
| 0 | 0 | 0 | 0 | EXTERNAL REQUEST *1  (INITIAL VALUE)<br>DUAL ADDRESS MODE<br>(BETWEEN EXTERNAL ADDRESS SPACES) |
| 0 | 0 | 0 | 1 | (USE IS PROHIBITED) |
| 0 | 0 | 1 | 0 | EXTERNAL REQUEST, SINGLE ADDRESS MODE.<br>EXTERNAL ADDRESS SPACE → EXTERNAL DEVICE |
| 0 | 0 | 1 | 1 | EXTERNAL REQUEST, SINGLE ADDRESS MODE.<br>EXTERNAL DEVICE → EXTERNAL ADDRESS SPACE |
| 0 | 1 | 0 | 0 | AUTOREQUEST<br>(BETWEEN EXTERNAL ADDRESS SPACES) *2 |
| 0 | 1 | 0 | 1 | AUTOREQUEST<br>(EXTERNAL ADDRESS SPACE → P BUS) *2 |
| 0 | 1 | 1 | 0 | AUTOREQUEST<br>(P BUS → EXTERNAL ADDRESS SPACE) *2 |
| 0 | 1 | 1 | 1 | (USE IS PROHIBITED) |
| 1 | 0 | 0 | 0 | EMPTY INTERRUPTION TRANSFER REQUEST FOR<br>SENDING DATA OF SCI1<br>(EXTERNAL ADDRESS SPACE → SCTDR) *2 |
| 1 | 0 | 0 | 1 | FULL INTERRUPTION TRANSFER REQUEST FOR<br>RECEIVING DATA OF SCI1<br>(SCRDR → EXTERNAL ADDRESS SPACE) *2 |
| 1 | 0 | 1 | 0 | EMPTY INTERRUPTION TRANSFER REQUEST FOR<br>SENDING DATA OF SCI2<br>(EXTERNAL ADDRESS SPACE → SCTDR) *2 |
| 1 | 0 | 1 | 1 | FULL INTERRUPTION TRANSFER REQUEST FOR<br>RECEIVING DATA OF SCI2<br>(SCRDR → EXTERNAL ADDRESS SPACE) *2 |
| 1 | 1 | 0 | 0 | TMU (INPUT CAPTURE INTERRUPTION,<br>EXTERNAL ADDRESS SPACES) *2 |
| 1 | 1 | 0 | 1 | TMU (INPUT CAPTURE INTERRUPTION,<br>EXTERNAL ADDRESS SPACE→BUILT-IN PERIPHERY) *2 |
| 1 | 1 | 1 | 0 | TMU (INPUT CAPTURE INTERRUPTION,<br>BUILT-IN PERIPHERY→EXTERNAL ADDRESS SPACE) *2 |
| 1 | 1 | 1 | 1 | (USE IS PROHIBITED) |

*1 : DESIGNATION OF EXTERNAL REQUEST IS
    VALID ONLY FOR CHANNELS 0, 1
*2 : DUAL ADDRESS MODE

FIG. 7

TRANSFER END BIT (TE)

| TE | EXPLANATION |
|---|---|
| 0 | DMATCR DESIGNATION NUMBER TRANSFER IS NOT COMPLETED (INITIAL VALUE)<br>[CLEAR CONDITIONS] 0 IS WRITTEN AFTER READING TE=1<br>POWER ON RESET, MANUAL RESET, STAND-BY |
| 1 | DMATCR DESIGNATION NUMBER TRANSFER IS COMPLETED |

FIG. 8

DESTINATION ADDRESS MODE INFORMATION (DM1, DM0)

| DM1 | DM0 | EXPLANATION |
|---|---|---|
| 0 | 0 | DESTINATION ADDRESS IS FIXED (INITIAL VALUE) |
| 0 | 1 | DESTINATION ADDRESS IS INCREASED<br>(+1 FOR TRANSFER OF 8 BITS, +2 FOR TRANSFER OF 16 BITS,<br>+4 FOR TRANSFER OF 32 BITS, +8 FOR TRANSFER OF 64 BITS,<br>+32 FOR TRANSFER OF 32 BYTES BURST) |
| 1 | 0 | DESTINATION ADDRESS IS REDUCED<br>(−1 FOR TRANSFER OF 8 BITS, −2 FOR TRANSFER OF 16 BITS,<br>−4 FOR TRANSFER OF 32 BITS, −8 FOR TRANSFER OF 64 BITS,<br>−32 FOR TRANSFER OF 32 BYTES BURST) |
| 1 | 1 | (SETTING IS PROHIBITED) |

FIG. 9

SOURCE ADDRESS MODE INFORMATION (SM1, SM0)

| SM1 | SM0 | EXPLANATION |
|---|---|---|
| 0 | 0 | SOURCE ADDRESS IS FIXED (INITIAL VALUE) |
| 0 | 1 | SOURCE ADDRESS IS INCREASED<br>(+1 FOR TRANSFER OF 8 BITS, +2 FOR TRANSFER OF 16 BITS,<br>+4 FOR TRANSFER OF 32 BITS, +8 FOR TRANSFER OF 64 BITS,<br>+32 FOR TRANSFER OF 32 BYTES BURST) |
| 1 | 0 | SOURCE ADDRESS IS REDUCED<br>(−1 FOR TRANSFER OF 8 BITS, −2 FOR TRANSFER OF 16 BITS,<br>−4 FOR TRANSFER OF 32 BITS, −8 FOR TRANSFER OF 64 BITS,<br>−32 FOR TRANSFER OF 32 BYTES BURST) |
| 1 | 1 | (SETTING IS PROHIBITED) |

FIG. 10

TRANSMIT SIZE INFORMATION (TS2, TS1, TS0)

| TS2 | TS1 | TS0 | EXPLANATION |
|---|---|---|---|
| 0 | 0 | 0 | QUAD WORD SIZE (64 BITS) DESIGNATION (INITIAL VALUE) |
| 0 | 0 | 1 | BYTE SIZE (8 BITS) DESIGNATION |
| 0 | 1 | 0 | WORD SIZE (16 BITS) DESIGNATION |
| 0 | 1 | 1 | LONG WORD SIZE (32 BITS) DESIGNATION |
| 1 | 0 | 0 | 32 BYTES BLOCK TRANSFER DESIGNATION |

FIG. 11

INTERRUPTION ENABLE BIT (IE)

| IE | EXPLANATION |
|---|---|
| 0 | INTERRUPTION REQUEST IS NOT GENERATED WHEN THE DMATCR DESIGNATION TRANSFER NUMBER IS COMPLETED (INITIAL VALUE) |
| 1 | INTERRUPTION REQUEST IS GENERATED WHEN THE DMATCR DESIGNATION TRANSFER NUMBER IS COMPLETED |

FIG. 12

TRANSMIT MODE BIT (TM)

| TM | EXPLANATION | |
|---|---|---|
| 0 | CYCLE STEAL MODE | (INITIAL VALUE) |
| 1 | BURST MODE | |

FIG. 13

DMA OPERATION REGISTER (DMAOR)

| BIT: | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INITIAL VALUE: | 0 | 0 | 0 | 0 | 0 | 0 | 0 | 0 | 0 | 0 | 0 | 0 | 0 | 0 | 0 | 0 |
| R/W: | R | R | R | R | R | R | R | R | R | R | R | R | R | R | R | R |

| BIT: | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  |  |  |  |  |  |  | PR1 | PR0 |  |  |  |  |  | AE | NMIF | DME |
| INITIAL VALUE: | 0 | 0 | 0 | 0 | 0 | 0 | 0 | 0 | 0 | 0 | 0 | 0 | 0 | 0 | 1 | 0 |
| R/W: | R | R | R | R | R | R | R/W | R/W | R | R | R | R | R | R/W | R/(W) | R/W |

FIG. 14

PRIORITY MODE INFORMATION

| PR1 | PR0 | EXPLANATION |  |
|---|---|---|---|
| 0 | 0 | CH0>CH1>CH2>CH3 | (INITIAL VALUE) |
| 0 | 1 | CH0>CH2>CH3>CH1 |  |
| 1 | 0 | CH2>CH0>CH1>CH3 |  |
| 1 | 1 | ROUND ROBIN MODE | (WHEN RESETTING, CH0>CH1>CH2>CH3) |

FIG. 15

ADDRESS ERROR FLAG (AE)

| AE | EXPLANATION |
|---|---|
| 0 | NO ADDRESS ERROR. DMA TRANSFER IS ALLOWED. (INITIAL VALUE)<br>[CLEAR CONDITIONS]: AE=0 IS WRITTEN AFTER READING AE=1 |
| 1 | ADDRESS ERROR EXISTS. DMA TRANSFER IS PROHIBITED.<br>[SET CONDITIONS]: GENERATION OF ADDRESS ERROR BY DMAC |

FIG. 16

NMI FLAG (NMIF)

| NMIF | EXPLANATION |
|---|---|
| 0 | NO NMI INPUT. DMA TRANSFER IS ALLOWED. (INITIAL VALUE)<br>[CLEAR CONDITIONS]: NMIF=0 IS WRITTEN AFTER READING NMIF=1 |
| 1 | NMI INPUT EXISTS. DMC TRANSFER IS PROHIBITED.<br>[SET CONDITIONS]: GENERATION OF NMI INTERRUPTION |

FIG. 17

MASTER ENABLE BIT (DME)

| DME | EXPLANATION |
|---|---|
| 0 | OPERATIONS OF ALL CHANNELS ARE PROHIBITED (INITIAL VALUE) |
| 1 | OPERATIONS OF ALL CHANNELS ARE ALLOWED |

FIG. 20A

ADDRESS ERROR JUDGING TABLE OF SOURCE ADDRESS REGISTER

| RS3 | RS2 | RS1 | RS0 | SAR[28] | SAR[27] | SAR[26] | SAERR | COMMENT |
|---|---|---|---|---|---|---|---|---|
| 0 | 0 | 0 | 0 | 1 | 1 | 1 | 1 | ACCESSING TO AN AREA7 FOR EXTERNAL REQUEST (BETWEEN EXTERNAL ADDRESS SPACE) |
| 0 | 0 | 0 | 1 | 1 | 1 | 1 | 1 | ACCESSING TO AN AREA7 FOR EXTERNAL REQUEST (EXTERNAL ADDRESS SPACE→EXTERNAL DEVICE) |
| 0 | 0 | 1 | 0 | 1 | 1 | 1 | 1 | ACCESSING TO AN AREA7 FOR AUTOREQUEST (BETWEEN EXTERNAL ADDRESS SPACES) |
| 0 | 0 | 1 | 1 | 1 | 1 | 1 | 1 | ACCESSING TO AN AREA7 FOR AUTOREQUEST (EXTERNAL ADDRESS SPACE→BUILT-IN PERIPHERY) |
| | | | | 0 | 0 | 0 | | ACCESSING TO THE AREA0 FOR AUTOREQUEST (BUILT-IN PERIPHERY→EXTERNAL ADDRESS SPACE) |
| | | | | 0 | 0 | 1 | 1 | ACCESSING TO THE AREA1 FOR AUTOREQUEST (BUILT-IN PERIPHERY→EXTERNAL ADDRESS SPACE) |
| | | | | 0 | 1 | 0 | | ACCESSING TO THE AREA2 FOR AUTOREQUEST (BUILT-IN PERIPHERY→EXTERNAL ADDRESS SPACE) |
| 0 | 1 | 1 | 0 | 0 | 1 | 1 | | ACCESSING TO THE AREA3 FOR AUTOREQUEST (BUILT-IN PERIPHERY→EXTERNAL ADDRESS SPACE) |
| | | | | 1 | 0 | 0 | | ACCESSING TO THE AREA4 FOR AUTOREQUEST (BUILT-IN PERIPHERY→EXTERNAL ADDRESS SPACE) |
| | | | | 1 | 0 | 1 | | ACCESSING TO THE AREA5 FOR AUTOREQUEST (BUILT-IN PERIPHERY→EXTERNAL ADDRESS SPACE) |
| | | | | 1 | 1 | 0 | | ACCESSING TO THE AREA6 FOR AUTOREQUEST (BUILT-IN PERIPHERY→EXTERNAL ADDRESS SPACE) |
| | | | | 1 | 1 | 1 | | ACCESSING TO THE AREA6 FOR AUTOREQUEST (BUILT-IN PERIPHERY→EXTERNAL ADDRESS SPACE) |

FIG. 20B

ADDRESS ERROR JUDGING TABLE OF SOURCE ADDRESS REGISTER

| RS3 | RS2 | RS1 | RS0 | SAR[28] | SAR[27] | SAR[26] | SAERR | COMMENT |
|---|---|---|---|---|---|---|---|---|
| 1 | 0 | 0 | 0 | 1 | 1 | 1 | 1 | ACCESSING TO THE AREA7 FOR EMPTY INTERRUPTION TRANSFER REQUEST OF SENDING DATA OF SCI1 (EXTERNAL ADDRESS SPACE→SCTDR) |
| 1 | 0 | 0 | 1 | 0 | 0 | 0 |   | ACCESSING TO THE AREA0 FOR FULL INTERRUPTION TRANSFER REQUEST OF RECEIVING DATA OF SCI1 (SCRDR→EXTERNAL ADDRESS SPACE) |
| 1 | 0 | 0 | 1 | 0 | 0 | 1 |   | ACCESSING TO THE AREA1 FOR FULL INTERRUPTION TRANSFER REQUEST OF RECEIVING DATA OF SCI1 (SCRDR→EXTERNAL ADDRESS SPACE) |
| 1 | 0 | 0 | 1 | 0 | 1 | 0 |   | ACCESSING TO THE AREA2 FOR FULL INTERRUPTION TRANSFER REQUEST OF RECEIVING DATA OF SCI1 (SCRDR→EXTERNAL ADDRESS SPACE) |
| 1 | 0 | 0 | 1 | 0 | 1 | 1 |   | ACCESSING TO THE AREA3 FOR FULL INTERRUPTION TRANSFER REQUEST OF RECEIVING DATA OF SCI1 (SCRDR→EXTERNAL ADDRESS SPACE) |
| 1 | 0 | 0 | 1 | 1 | 0 | 0 |   | ACCESSING TO THE AREA4 FOR FULL INTERRUPTION TRANSFER REQUEST OF RECEIVING DATA OF SCI1 (SCRDR→EXTERNAL ADDRESS SPACE) |
| 1 | 0 | 0 | 1 | 1 | 0 | 1 |   | ACCESSING TO THE AREA5 FOR FULL INTERRUPTION TRANSFER REQUEST OF RECEIVING DATA OF SCI1 (SCRDR→EXTERNAL ADDRESS SPACE) |
| 1 | 0 | 0 | 1 | 1 | 1 | 0 |   | ACCESSING TO THE AREA6 FOR FULL INTERRUPTION TRANSFER REQUEST OF RECEIVING DATA OF SCI1 (SCRDR→EXTERNAL ADDRESS SPACE) |
| 1 | 0 | 0 | 1 | 1 | 1 | 1 | 1 | ACCESSING TO THE AREA7 FOR FULL INTERRUPTION TRANSFER REQUEST OF RECEIVING DATA OF SCI1 (SCRDR→EXTERNAL ADDRESS SPACE) |
| 1 | 0 | 1 | 0 | 1 | 1 | 1 | 1 | ACCESSING TO THE AREA7 FOR EMPTY INTERRUPTION TRANSFER REQUEST OF SENDING DATA OF SCI2 (EXTERNAL ADDRESS SPACE→SCTDR) |
| 1 | 0 | 1 | 1 | 0 | 0 | 0 |   | ACCESSING TO THE AREA0 FOR FULL INTERRUPTION TRANSFER REQUEST OF RECEIVING DATA OF SCI2 (SCRDR→EXTERNAL ADDRESS SPACE) |
| 1 | 0 | 1 | 1 | 0 | 0 | 1 |   | ACCESSING TO THE AREA1 FOR FULL INTERRUPTION TRANSFER REQUEST OF RECEIVING DATA OF SCI2 (SCRDR→EXTERNAL ADDRESS SPACE) |
| 1 | 0 | 1 | 1 | 0 | 1 | 0 |   | ACCESSING TO THE AREA2 FOR FULL INTERRUPTION TRANSFER REQUEST OF RECEIVING DATA OF SCI2 (SCRDR→EXTERNAL ADDRESS SPACE) |
| 1 | 0 | 1 | 1 | 0 | 1 | 1 |   | ACCESSING TO THE AREA3 FOR FULL INTERRUPTION TRANSFER REQUEST OF RECEIVING DATA OF SCI2 (SCRDR→EXTERNAL ADDRESS SPACE) |
| 1 | 0 | 1 | 1 | 1 | 0 | 0 |   | ACCESSING TO THE AREA4 FOR FULL INTERRUPTION TRANSFER REQUEST OF RECEIVING DATA OF SCI2 (SCRDR→EXTERNAL ADDRESS SPACE) |
| 1 | 0 | 1 | 1 | 1 | 0 | 1 |   | ACCESSING TO THE AREA5 FOR FULL INTERRUPTION TRANSFER REQUEST OF RECEIVING DATA OF SCI2 (SCRDR→EXTERNAL ADDRESS SPACE) |
| 1 | 0 | 1 | 1 | 1 | 1 | 0 |   | ACCESSING TO THE AREA6 FOR FULL INTERRUPTION TRANSFER REQUEST OF RECEIVING DATA OF SCI2 (SCRDR→EXTERNAL ADDRESS SPACE) |

FIG. 20C

ADDRESS ERROR JUDGING TABLE OF SOURCE ADDRESS REGISTER

| RS3 | RS2 | RS1 | RS0 | SAR[28] | SAR[27] | SAR[26] | SAERR | COMMENT |
|---|---|---|---|---|---|---|---|---|
| 1 | 1 |   | 0 | 1 | 1 | 1 | 1 | ACCESSING TO THE AREA7 FOR TMU INPUT CAPTURE INTERRUPTION TRANSFER REQUEST (BETWEEN EXTERNAL ADDRESS SPACES) |
| 1 | 1 |   | 1 | 1 | 1 | 1 | 1 | ACCESSING TO THE AREA7 FOR TMU INPUT CAPTURE INTERRUPTION TRANSFER REQUEST (EXTERNAL ADDRESS SPACE→BUILT-IN PERIPHERY) |
|   |   |   |   | 0 | 0 | 0 |   | ACCESSING TO THE AREA0 FOR TMU INPUT CAPTURE INTERRUPTION TRANSFER REQUEST (BUILT-IN PERIPHERY→EXTERNAL ADDRESS SPACE) |
|   |   |   |   | 0 | 0 | 1 | 1 | ACCESSING TO THE AREA1 FOR TMU INPUT CAPTURE INTERRUPTION TRANSFER REQUEST (BUILT-IN PERIPHERY→EXTERNAL ADDRESS SPACE) |
|   |   |   |   | 0 | 1 | 0 |   | ACCESSING TO THE AREA2 FOR TMU INPUT CAPTURE INTERRUPTION TRANSFER REQUEST (BUILT-IN PERIPHERY→EXTERNAL ADDRESS SPACE) |
|   | 1 | 1 |   | 0 | 1 | 1 |   | ACCESSING TO THE AREA3 FOR TMU INPUT CAPTURE INTERRUPTION TRANSFER REQUEST (BUILT-IN PERIPHERY→EXTERNAL ADDRESS SPACE) |
|   |   |   |   | 1 | 0 | 0 |   | ACCESSING TO THE AREA4 FOR TMU INPUT CAPTURE INTERRUPTION TRANSFER REQUEST (BUILT-IN PERIPHERY→EXTERNAL ADDRESS SPACE) |
|   |   |   |   | 1 | 0 | 1 |   | ACCESSING TO THE AREA5 FOR TMU INPUT CAPTURE INTERRUPTION TRANSFER REQUEST (BUILT-IN PERIPHERY→EXTERNAL ADDRESS SPACE) |
|   |   |   |   | 1 | 1 | 0 |   | ACCESSING TO THE AREA6 FOR TMU INPUT CAPTURE INTERRUPTION TRANSFER REQUEST (BUILT-IN PERIPHERY→EXTERNAL ADDRESS SPACE) |

FIG. 21A

DESTINATION ADDRESS REGISTER ADDRESS ERROR JUDGMENT TABLE

| RS3 | RS2 | RS1 | RS0 | SAR[28] | SAR[27] | SAR[26] | SAERR | COMMENT |
|---|---|---|---|---|---|---|---|---|
| 0 | 0 | 0 | 0 | 1 | 1 | 1 | 1 | ACCESSING TO THE AREA7 FOR EXTERNAL REQUEST (BETWEEN EXTERNAL ADDRESSES) |
| 0 | 0 | 1 | 1 | 1 | 1 | 1 | 1 | ACCESSING TO THE AREA7 FOR EXTERNAL REQUEST (EXTERNAL DEVICE→EXTERNAL ADDRESS SPACE) |
| 0 | 1 | 0 | 0 | 1 | 1 | 1 | 1 | ACCESSING TO THE AREA7 FOR AUTOREQUEST (BETWEEN EXTERNAL ADDRESS SPACES) |
|   |   |   |   | 0 | 0 | 0 |   | ACCESSING TO THE AREA0 FOR AUTOREQUEST (EXTERNAL ADDRESS SPACE→BUILT-IN PERIPHERY) |
|   |   |   |   | 0 | 0 | 1 |   | ACCESSING TO THE AREA1 FOR AUTOREQUEST (EXTERNAL ADDRESS SPACE→BUILT-IN PERIPHERY) |
|   |   |   |   | 0 | 1 | 0 |   | ACCESSING TO THE AREA2 FOR AUTOREQUEST (EXTERNAL ADDRESS SPACE→BUILT-IN PERIPHERY) |
| 0 | 1 | 1 | 1 | 0 | 1 | 1 | 1 | ACCESSING TO THE AREA3 FOR AUTOREQUEST (EXTERNAL ADDRESS SPACE→BUILT-IN PERIPHERY) |
|   |   |   |   | 1 | 0 | 0 |   | ACCESSING TO THE AREA4 FOR AUTOREQUEST (EXTERNAL ADDRESS SPACE→BUILT-IN PERIPHERY) |
|   |   |   |   | 1 | 0 | 1 |   | ACCESSING TO THE AREA5 FOR AUTOREQUEST (EXTERNAL ADDRESS SPACE→BUILT-IN PERIPHERY) |
|   |   |   |   | 1 | 1 | 0 |   | ACCESSING TO THE AREA6 FOR AUTOREQUEST (EXTERNAL ADDRESS SPACE→BUILT-IN PERIPHERY) |

FIG. 21B

DESTINATION ADDRESS REGISTER ADDRESS ERROR JUDGMENT TABLE

| RS3 | RS2 | RS1 | RS0 | SARI28 | SARI27 | SARI26 | SAERR | COMMENT |
|---|---|---|---|---|---|---|---|---|
| 0 | 1 | 1 | 0 | 1 | 1 | 1 | 1 | ACCESSING TO THE AREA7 FOR AUTOREQUEST (BUILT-IN PERIPHERY→EXTERNAL ADDRESS SPACE) |
|   |   |   |   | 0 | 0 | 0 |   | ACCESSING TO THE AREA0 FOR EMPTY INTERRUPTION TRANSFER REQUEST OF SENDING DATA OF SCI1 (EXTERNAL ADDRESS SPACE→SCTDR) |
|   |   |   |   | 0 | 0 | 1 |   | ACCESSING TO THE AREA1 FOR EMPTY INTERRUPTION TRANSFER REQUEST OF SENDING DATA OF SCI1 (EXTERNAL ADDRESS SPACE→SCTDR) |
|   |   |   |   | 0 | 1 | 0 |   | ACCESSING TO THE AREA2 FOR EMPTY INTERRUPTION TRANSFER REQUEST OF SENDING DATA OF SCI1 (EXTERNAL ADDRESS SPACE→SCTDR) |
|   |   |   |   | 0 | 1 | 1 |   | ACCESSING TO THE AREA3 FOR EMPTY INTERRUPTION TRANSFER REQUEST OF SENDING DATA OF SCI1 (EXTERNAL ADDRESS SPACE→SCTDR) |
| 1 | 0 | 0 | 0 | 1 | 0 | 0 | 1 | ACCESSING TO THE AREA4 FOR EMPTY INTERRUPTION TRANSFER REQUEST OF SENDING DATA OF SCI1 (EXTERNAL ADDRESS SPACE→SCTDR) |
|   |   |   |   | 1 | 0 | 1 |   | ACCESSING TO THE AREA5 FOR EMPTY INTERRUPTION TRANSFER REQUEST OF SENDING DATA OF SCI1 (EXTERNAL ADDRESS SPACE→SCTDR) |
|   |   |   |   | 1 | 1 | 0 |   | ACCESSING TO THE AREA6 FOR EMPTY INTERRUPTION TRANSFER REQUEST OF SENDING DATA OF SCI1 (EXTERNAL ADDRESS SPACE→SCTDR) |
| 1 | 0 | 0 | 1 | 1 | 1 | 1 | 1 | ACCESSING TO THE AREA7 FOR FULL INTERRUPTION TRANSFER REQUEST OF RECEIVING DATA OF SCI1 (SCRDR→EXTERNAL ADDRESS SPACE) |
|   |   |   |   | 0 | 0 | 0 |   | ACCESSING TO THE AREA0 FOR EMPTY INTERRUPTION TRANSFER REQUEST OF SENDING DATA OF SCI2 (EXTERNAL ADDRESS SPACE→SCTDR) |
|   |   |   |   | 0 | 0 | 1 |   | ACCESSING TO THE AREA1 FOR EMPTY INTERRUPTION TRANSFER REQUEST OF SENDING DATA OF SCI2 (EXTERNAL ADDRESS SPACE→SCTDR) |
|   |   |   |   | 0 | 1 | 0 |   | ACCESSING TO THE AREA2 FOR EMPTY INTERRUPTION TRANSFER REQUEST OF SENDING DATA OF SCI2 (EXTERNAL ADDRESS SPACE→SCTDR) |
| 1 | 0 | 1 | 0 | 0 | 1 | 1 |   | ACCESSING TO THE AREA3 FOR EMPTY INTERRUPTION TRANSFER REQUEST OF SENDING DATA OF SCI2 (EXTERNAL ADDRESS SPACE→SCTDR) |
|   |   |   |   | 1 | 0 | 0 |   | ACCESSING TO THE AREA4 FOR EMPTY INTERRUPTION TRANSFER REQUEST OF SENDING DATA OF SCI2 (EXTERNAL ADDRESS SPACE→SCTDR) |
|   |   |   |   | 1 | 0 | 1 |   | ACCESSING TO THE AREA5 FOR EMPTY INTERRUPTION TRANSFER REQUEST OF SENDING DATA OF SCI2 (EXTERNAL ADDRESS SPACE→SCTDR) |
|   |   |   |   | 1 | 1 | 0 |   | ACCESSING TO THE AREA6 FOR EMPTY INTERRUPTION TRANSFER REQUEST OF SENDING DATA OF SCI2 (EXTERNAL ADDRESS SPACE→SCTDR) |

FIG. 21C

DESTINATION ADDRESS REGISTER ADDRESS ERROR JUDGMENT TABLE

| RS3 | RS2 | RS1 | RS0 | SAR[28] | SAR[27] | SAR[26] | SAERR | COMMENT |
|---|---|---|---|---|---|---|---|---|
| 1 | 0 | 1 | 1 | 1 | 1 | 1 | 1 | ACCESSING TO THE AREA7 FOR FULL INTERRUPTION TRANSFER REQUEST OF RECEIVING DATA OF SCI2 (SCRDR→EXTERNAL ADDRESS SPACE) |
| 1 | 1 | 0 | 0 | 0 | 1 | 1 | 1 | ACCESSING TO THE AREA7 FOR TMU INPUT CAPTURE INTERRUPTION TRANSFER REQUEST (BETWEEN EXTERNAL ADDRESS SPACES) |
|  |  |  |  | 0 | 1 | 0 |  | ACCESSING TO THE AREA0 FOR TMU INPUT CAPTURE INTERRUPTION TRANSFER REQUEST (EXTERNAL ADDRESS SPACE→BUILT-IN PERIPHERY) |
|  |  |  |  | 0 | 0 | 1 |  | ACCESSING TO THE AREA1 FOR TMU INPUT CAPTURE INTERRUPTION TRANSFER REQUEST (EXTERNAL ADDRESS SPACE→BUILT-IN PERIPHERY) |
|  |  |  |  | 0 | 0 | 0 |  | ACCESSING TO THE AREA2 FOR TMU INPUT CAPTURE INTERRUPTION TRANSFER REQUEST (EXTERNAL ADDRESS SPACE→BUILT-IN PERIPHERY) |
| 1 |  |  | 1 | 0 | 1 | 1 | 1 | ACCESSING TO THE AREA3 FOR TMU INPUT CAPTURE INTERRUPTION TRANSFER REQUEST (EXTERNAL ADDRESS SPACE→BUILT-IN PERIPHERY) |
|  |  |  |  | 1 | 1 | 0 |  | ACCESSING TO THE AREA4 FOR TMU INPUT CAPTURE INTERRUPTION TRANSFER REQUEST (EXTERNAL ADDRESS SPACE→BUILT-IN PERIPHERY) |
|  |  |  |  | 1 | 0 | 1 |  | ACCESSING TO THE AREA5 FOR TMU INPUT CAPTURE INTERRUPTION TRANSFER REQUEST (EXTERNAL ADDRESS SPACE→BUILT-IN PERIPHERY) |
|  |  |  |  | 1 | 1 | 0 |  | ACCESSING TO THE AREA6 FOR TMU INPUT CAPTURE INTERRUPTION TRANSFER REQUEST (EXTERNAL ADDRESS SPACE→BUILT-IN PERIPHERY) |
|  |  |  |  | 1 | 0 | 1 |  | ACCESSING TO THE AREA7 FOR TMU INPUT CAPTURE INTERRUPTION TRANSFER REQUEST (EXTERNAL ADDRESS SPACE→BUILT-IN PERIPHERY) |
| 1 | 1 | 1 | 0 | 1 | 1 | 1 | 1 | ACCESSING TO THE AREA7 FOR TMU INPUT CAPTURE INTERRUPTION TRANSFER REQUEST (BUILT-IN PERIPHERY→EXTERNAL ADDRESS SPACE) |

DMA TRANSFER CONTROL BY
MEMORY PROTECTION FUNCTION

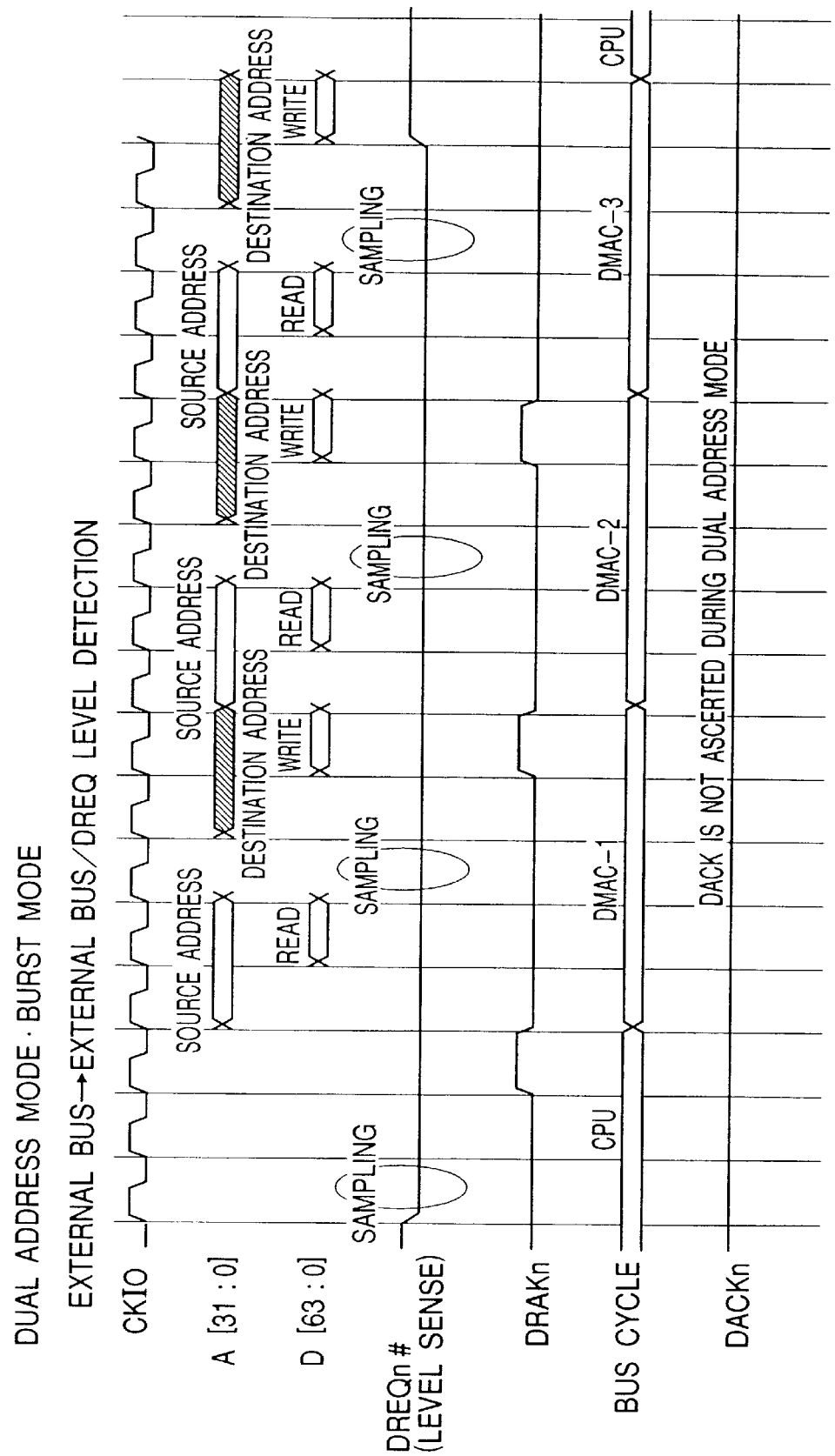

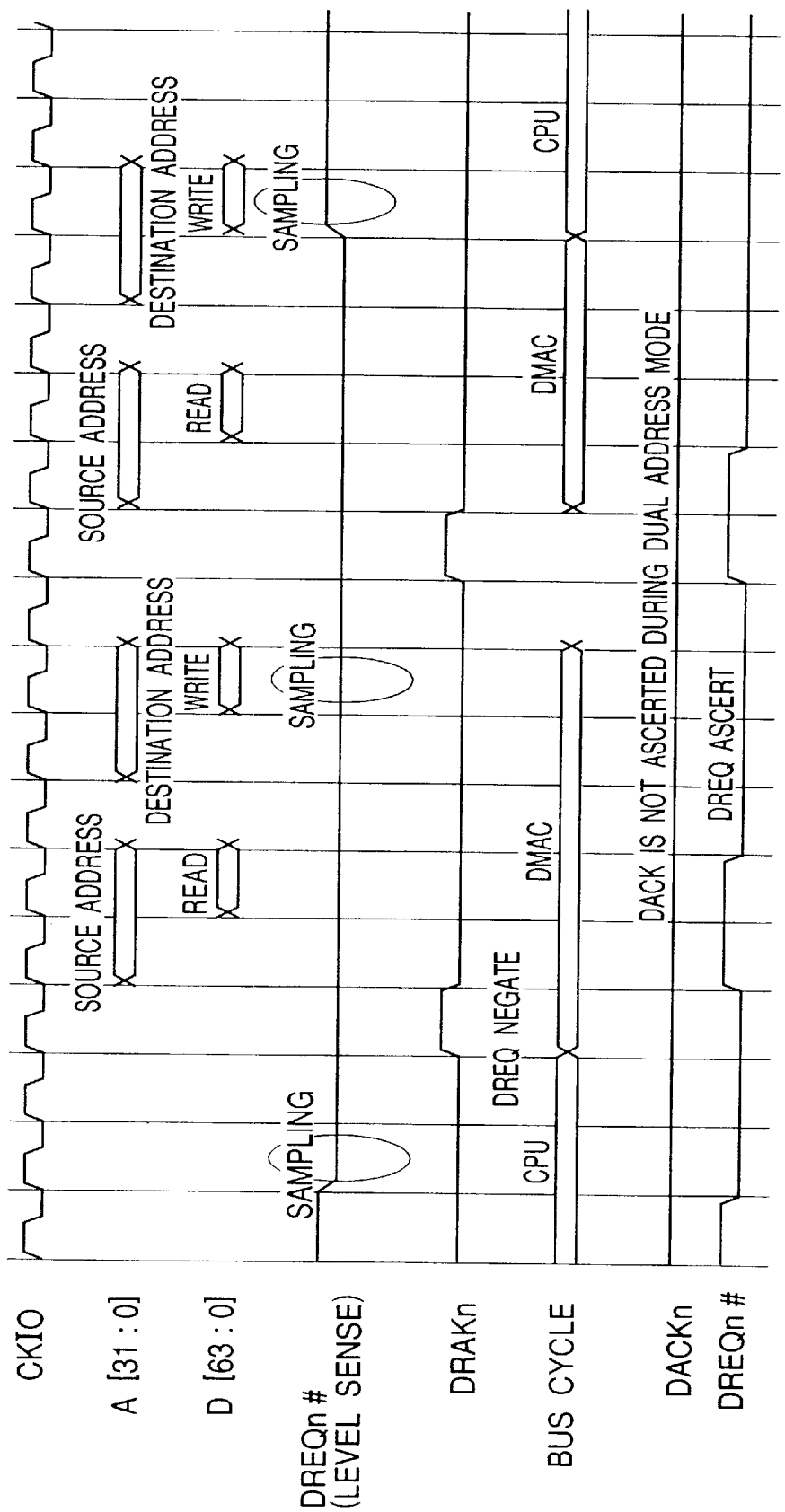

DATA TRANSFER CONTROLLER, MICROCOMPUTER AND DATA PROCESSING SYSTEM

This is a continuation of application Ser. No. 09/061,128, filed Apr. 16, 1998, now U.S. Pat. No. 6,202,154.

BACKGROUND OF THE INVENTION

The present invention relates to a memory protection function (or data protection function) in a data transfer control apparatus, such as a DMAC (Direct Memory Access Controller), and, more specifically, to technology which is effective for application, for example, to a microcomputer (processor or microprocessor) and a data processing system having a memory management unit.

The load on a microcomputer, processor or CPU (Central Processing Unit) for effecting data transfer can be eased by use of a DMAC. In data transfer using a DMAC, a processor or CPU initially sets the transfer destination address or transfer source address into a transfer destination address register and transfer source address register in the DMAC, and the DMAC, having completed initial setting thereof, upon receiving the data transfer request, executes a data transfer by acquiring the bus right from the processor or CPU. As is obvious from this explanation, when a DMAC is provided, one access route is provided for the memory and register.

Nowadays, many computer systems support a virtual memory and provide substantial memory protection by means of a memory management unit (MMU). Therefore, when the processor and CPU make access to a register and memory, memory protection by the memory management unit can be realized. However, when the computer system includes a DMAC, since the CPU and processor set the data transfer destination address and transfer source address by direct memory access to the register in the DMAC as data, the memory protection is not effectuated in the course of an address conversion by the memory management unit. In other words, when a DMAC is provided between the MMU and an external input/output circuit, the transfer destination and transfer source address set in the DMAC are used directly as a physical address without passing through the MMU, and thereby the protection function performed by the MMU cannot be realized. Thereby, when the access route is provided by the DMAC, there is a fear that data or a program may be corrupted unexpectedly by an erroneous access to an access prohibited region or that security cannot be maintained because the OS (Operating System) and system data can be read freely.

The Japanese Patent Application Laid-open No. SHO 62-191950 describes a technique for memory protection which involves comparing an output address of the DMAC with a protection address, and the Japanese Patent Application Laid-open No. HEI 1-250162 describes a control system for write protection of a memory which involves comparing an output address of a DMAC with a write protect address. Moreover, the Japanese Patent Application Laid-open No. HEI 6-266648 describes a technique for intercepting an access to the main memory by a direct memory access control mechanism when the address output from the direct memory access control mechanism exceeds a data transfer allowable range on the main memory.

In addition, the Japanese Patent Application Laid-open No. HEI 2-297235 describes a technique involving a memory data protection circuit having region information indicating whether a relevant address region is a program region or a data region corresponding to an address of the main memory, making it possible to identify an irregular evens when the region information corresponding to the program fetch address of the main memory indicates a data region or to control a write request when the region information corresponding to the write address to the main memory indicates a program region.

Finally, Japanese Patent Application Laid-open No. HEI 6-119250 describes a technique for memory protection which involves forcibly setting a part of the output address signal of the device for DMA transfer control to a constant value.

SUMMARY OF THE INVENTION

However, the techniques mentioned above are intended to realize memory protection from outside of the device after the device, such as a DMAC, has started data transfer to output an address signal. That is, even if an access violates the memory protection, the device itself, such as a DMAC, first starts the data transfer operation. Since it is impossible in this case to control an operation of the DMAC itself which violates the memory protection, this operation of the circuit, such as a DMAC, is to a certain degree useless.

Moreover, since memory protection is executed to a particularly set address range, like a protection address or write protect address, if the protection address, etc. is undesirably updated because the setting is done erroneously for the protection addresses and the CPU operates under an uncontrollable condition, memory protection cannot be realized and the reliability of the memory protection becomes rather low. As described in the Japanese Patent Application Laid-open No. HEI 6-119250, even when a part of the output address signal of the device for DMA transfer control is updated to a constant value, the situation is the same, if an error exists in the setting of the constant value information.

It is therefore a first object of the present invention to provide a data transfer controller which can control a data transfer operation by itself when a violation of memory protection occurs.

It is a second object of the present invention to provide a data transfer controller which can improve the reliability of memory protection.

It is a third object of the present invention to provide a microcomputer, microprocessor and moreover a data processing system, which can reduce the possibility of useless data transfer as much as possible by a data transfer controller even if a data transfer request which violates memory protection is issued, thereby to contribute to improvement of the data processing efficiency.

It is a fourth object of the present invention to provide a microcomputer, microprocessor and moreover a data processing system, which can improve safe system operation as it relates to memory protection by a data transfer controller.

The aforementioned and other objects and novel characteristics of the present invention will become more apparent from the following description and the accompanying drawings.

Typical features of the present invention disclosed in this application will be explained briefly.

That is, the data transfer control circuit (8) has a storing region, in a control register (CHCRn), for resource select information (RS0 to RS3) to designate with a plurality of bits a mode of operation involving a combination of the data transfer source area and data transfer destination. This data transfer control circuit (8) refers to the transfer source address, transfer destination address and resource select information initially set to the address register (SARn, DARn) and detects, with an address error detector (96), an address error indicating that at least one of the transfer source address and data transfer destination address is deviated from the mode operation for the combination of the data transfer source area and data transfer destination designated by the resource select information in order to determine permission/prohibition of the data transfer. When data transfer is to be permitted, the data transfer controller asserts a signal, such as a bus right request signal (BREQ) to obtain the bus right from the other bus master, such as the CPU, and thereafter starts the data transfer operation. When data transfer is to be prohibited, the data transfer controller does not assert the bus right request signal, but asserts, for example, an address error interruption signal, in place of such bus right request signal, and transfers the process for dealing with such address error, for example, to the central processing unit (3).

The features explained above detects a memory protection violation specified by the data transfer controller as an address error. The application for data transfer (combination of the data transfer source area and transfer destination) of only one data transfer channel formed by the address register and control register is determined by the resource select information. With reference to the application for data transfer, when at least one of the transfer destination address and transfer source address is corrupted, the start of the data transfer operation is prohibited. Therefore, when the transfer destination and transfer source addresses to be set to the address register are corrupted for the combination of the transfer origination circuit and transfer destination circuit assigned to only one data transfer channel due to the setting error, noise or uncontrolled running of the system, the data transfer operation is prohibited. Moreover, if a setting error or unwanted update of the resource select information occurs, the data transfer operation is also prohibited even when the transfer origination and transfer destination addresses to be set to the address register are normal.

As explained above, a mode of operation involving a combination between the transfer source area and the transfer destination assuring data transfer is predetermined depending on a value of the resource select information, and the address error detector has address error determining logic conforming to the defined content and detects, on the basis of such logical structure, an address error which disables data transfer control by the data transfer controller depending on the resource select information of the control register and transfer source address and transfer destination address of the address register. Since the data transfer is started only when the resource select information is matched with the setting information of the address register, a higher reliability of memory protection can be assured for the data transfer operation by the data transfer controller. Moreover, the data transfer controller itself can control the data transfer operation for avoiding a memory protection violation by the data transfer controller, and thereby can avoid a useless data transfer operation.

According to a further detail of the feature explained above, the data transfer controller (8) comprises a plurality of data transfer charnels haying address registers (SARn, DARn) and control registers (CHCRn), an internal bus (80) connected to address registers and control registers included in a plurality of data transfer channels, a bus interface circuit (81) for interfacing the internal bus with an external circuit, and control circuits (82 to 85) for executing transfer control via the bus interface circuit by utilizing one data transfer channel in a plurality of data transfer channels depending on the data transfer request. To an address register, the data transfer source address and data transfer destination address are set.

The control register has a storing region for storing resource select information (RS0 to RS3) for designating, by a plurality of bits, a mode of operation involving a combination of a data transfer request source area assigned to the data transfer channel, including the relevant control register, a data transfer source area responding to the data transfer request from the requesting section and a data transfer destination. The control register also comprises an address error detector (96) for detecting an address error indicating that at least one of the data transfer source area address and data transfer destination address set to the address register is inconsistent with the mode of operation involving the combination of the data transfer source area designated by the resource select information included in the control register and the data transfer destination.

The control circuit determines the data transfer channel for responding to the request source area when a data transfer request is issued from the resource select information set to the control register. The control circuit further executes the data transfer operation using the data transfer channel responding to the data transfer request under the condition that an address error is not detected. The information identifying the transfer request source area included in the resource select information is similar to the information designating the kind of transfer request. In such a mode, the resource select information also designates the data transfer request issuing area or the kind of data transfer request assigned to the relevant data transfer channel. That is, the data transfer channel to be used for the data transfer request is determined by referring to the resource select information. The data transfer request is equivalent, for example, to a data transfer request from a particular peripheral circuit or a starting request (setting of the transfer enable bit (DE) of the control register) by the CPU. For example, the data transfer requesting area is indicated by the data transfer request signal individualized for each kind of requesting area or additional information indicating the requesting area. When the setting of the transfer enable bit is designated as a transfer request, the transfer requesting area is the CPU, and a value for equalizing the setting of the transfer enable bit to the starting request or starting request area is set in the resource select information.

In the event of exclusively operating a plurality of data transfer channels, priority may be changed by further providing an operation register (MDAOR) which is connected to the internal bus for common use for a plurality of data transfer channels and assigning, to this operation register, a storing region for storing the priority information (PR0, PR1) to determine the priority of the data transfer channels to execute a data transfer request when a plurality of data transfer requests are competing. In this case, the control circuit gives priority to the data transfer request for the data transfer channel having the higher priority depending on the priority information when the data transfer requests are competing for a plurality of data transfer channels at the time of determining a data transfer channel.

The microcomputer (1) which includes the data transfer controller comprises a central processing unit CPU(3), memory management units (40, 41, 42) for converting the logical addresses output from the CPU into physical addresses, a data transfer controller (8), a bus state controller (51) for controlling the bus access cycle depending on the physical address output from the memory management unit or the physical address output from the data transfer controller, built-in peripheral circuits (70 to 74) connected to the bus state controller vie the peripheral buses (56, 57) and an external bus interface circuit (6) coupled with the bus state controller. In this case, the CPU executes the setting for each register of the data transfer controller via the memory management unit, the data transfer controller allows, at the time of executing a data transfer in response to a data transfer request, the bus state controller to assert the bus right request signal (BREQ) and starts the data transfer after the responding bus right acknowledgment signal (BACK) is asserted by the bus state controller.

The microcomputer can be constituted by integration on a single semiconductor substrate.

The data processing system comprises a microcomputer, external buses (60, 61) coupled with the external bus interface circuit and external peripheral circuits (62 to 65) coupled with the external buses.

At the time of address conversion by the memory management unit, the microcomputer carries out memory protection for the address space administered by the CPU to prohibit access, for example, to the system space in the user mode. The memory protection by the memory management unit is effective for the access address In this case, the transfer controller (8) prohibits the start of data transfer for the transfer destination address and transfer source address, as explained above, when the CPU (3) designates a setting when the transfer mode of the resource select information is in conflict with the transfer destination address and/or transfer source address being set as data in the address registers. Therefore, the data protection for the access prohibiting area can also be realized for a data transfer operation by the data transfer controller to which the memory protection of the memory management unit is not directly available, and thereby safe operation of the data processing system can be enhanced. Moreover, the data transfer controller itself can prohibit a data transfer operation which is likely to produce a memory protection violation by the data transfer controller, thereby avoiding a useless data transfer operation, while contributing to the improvement of the data processing efficiency by the data processing system and the microcomputer.

A mode for detecting an address error by the address error detector in the data transfer controller comprising a microcomputer incorporated in the data processing system can be defined as (1) a condition where the transfer source address preset to the address register, when the data transfer source area responding to the data transfer request is a built in peripheral circuit, indicates an external peripheral circuit, (2) a condition where the transfer source address preset in the address register indicates a built-in peripheral circuit when the data transfer source area responding to the data transfer request is an external peripheral circuit, (3) a condition where the transfer destination address preset in the address register indicates an external peripheral circuit when the data transfer destination responding to the data transfer request is a built-in peripheral circuit, and (4) a condition where the transfer destination address preset in the address register indicates an internal peripheral circuit when the data transfer destination responding to the data transfer request is an external peripheral circuit. This address error mode can prevent erroneous operation caused by a serious memory protection violation resulting from a mistake concerning the internal space and the external space of the microcomputer.

BRIEF DESCRIPTION OF THE DRAWINGS

FIG. 4 is a format diagram showing an example of a channel control register.

FIG. 5 is a diagram for explaining channel enable bits.

FIG. 6 is a diagram for explaining resource select information.

FIG. 7 is a diagram for explaining transfer end bits.

FIG. 8 is a diagram for explaining destination address mode information.

FIG. 9 is a diagram for explaining source address mode information.

FIG. 10 is a diagram for explaining transmission size information.

FIG. 11 is a diagram for explaining interruption enable bits.

FIG. 12 is a diagram for explaining transmission mode bits.

FIG. 13 is a formal diagram of an example of an operation register.

FIG. 14 is a diagram for explaining priority mode information.

FIG. 15 is a diagram for explaining an address error flag.

FIG. 16 is a diagram for explaining a NMI flag.

FIG. 17 is a diagram for explaining master enable bits.

FIGS. 20A to 20C are diagrams for explaining an address error mode of the source address by a source address comparator.

FIGS. 21A to 21C are diagrams for explaining an address error of a destination address by a destination address comparator.

FIG. 25 is a timing chart as an example for executing data transfer after waiting for generation of a transfer request when an address error is not detected in a case where a dual address mode and burst mode are designated.

FIG. 26 is a timing chart as an example for executing data transfer after generation of a transfer request when an address error is not detected in a case where a dual address mode and cycle steal mode are designated.

DETAILED DESCRIPTION OF THE PREFERRED EMBODIMENTS

<<Summary of Microcomputer>>

Figure 1:
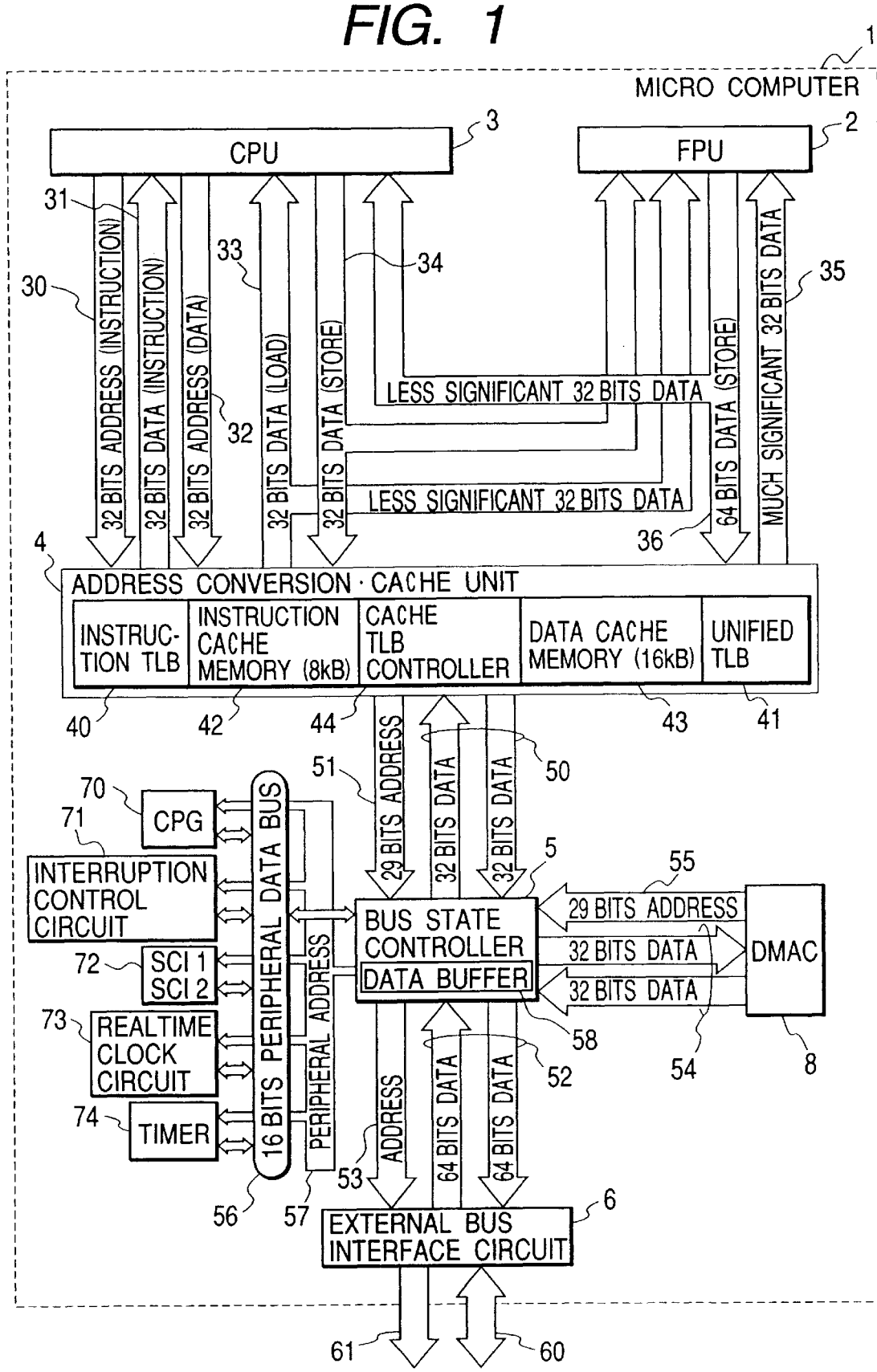
FIG. 1 is a block diagram of a microcomputer providing an example of the present invention.

FIG. 1 shows a microcomputer (microprocessor or processor) providing an example of the present invention.

The microcomputer 1 shown in this figure is composed, although the invention is not particularly restricted thereto, of an integrated circuit formed on only one semiconductor substrate, such as a single crystal silicon substrate. The microcomputer 1 has a floating point unit (referred to as FPU) 2. Moreover, the microcomputer 1 is provided with a central processing unit (referred to as CPU) 3 which can operate on integers. The microcomputer 1 has, although the invention is not particularly restricted thereto, a 32-bit RISC (Reduced Instruction Set Computer) architecture having a 16-bit fixed length instruction set.

In FIG. 1, the reference numeral 4 designates an address conversion.cache unit. To realize instruction access and data access in parallel by CPU 3, the address conversion.cache unit 4 individually has an instruction address conversion buffer for an instruction (also referred to as an instruction TLB) 40 and a unified address conversion buffer for data (also referred to as a unified TLB) 41. Moreover, an instruction cache memory 42 and data cache memory 43 are also individualized. The cache.address conversion buffer controller (also referred to as a cache TLB controller) 44 totally controls the address conversion.cache unit 4.

In FIG. 1, the reference numeral 5 designates a bus state controller which is connected to the address conversion-.cache unit 4 via a 32-bit data bus 50 and a 29-bit address bus 51. This bus state controller 5 is connected with the DMAC 8 as a data transfer controller via the data bus 54 and address bus 55.

In the microcomputer 1, CPU 3 and DMAC 8 form a bus master module. External access by the microcomputer 1 is executed by the external bus interface circuit 6 connected to the bus state controller 5 via the 64-bit data bus 52 and address bus 53. The external bus interface circuit 6 is connected to the external data bus 60 and the external address bus 61.

The microcomputer 1 comprises, as built-in peripheral circuits connected to a 16-bit peripheral data bus 56 and a peripheral address bus 57, a clock pulse generator (referred to as CPG) 70, an interruption control circuit 71, a serial communication interface controller (SCI1, SCI2) 72, a real-time clock circuit 73 and a timer 74 These peripheral circuits are accessed by the CPU 3 or the DMAC 8 via the bus state controller 5.

The bus state controller 5 controls insertion of access data size, access time and wait state depending on the access object circuit (address area as the access object) by the CPU 3 and the DMAC 8. In FIG. 1, reference numeral 58 designates a data buffer.

The CPU 3 outputs an instruction address to the 32 bit instruction address bus 30 at the time of fetching an instruction and also fetches an instruction output to the instruction data bus 31. Moreover, the CPU3 outputs a data address to the 32-bit data address bus 32, reads (loads) the data via the 32-bit data bus 33 and writes (stores) the data via the 32-bit data bus 34. The instruction address and data address are logical addresses.

The FPU 2 is not provided, although the invention is not particularly so restricted, with a memory addressing capability for making access to the data cache memory 43. The CPU 3 executes, in place of FPU 2, an addressing operation for making access to data, thereby saving the chip area by eliminating the necessity of providing a memory addressing circuit in FPU 2. Loading of data to FPU 2 is executed via the 32-bit data bus 33 and 32-bit data bus 35 and storing of data from FPU 2 is executed via the 64-bit data bus 36. Data transfer to CPU 3 from FPU 2 is executed using the less significant 32 bits of the 64-bit data bus 36.

The CPU 3 fetches not only the data for the FPU 2 but also all instructions, including the floating point instructions, for the FPU 2. A floating point instruction fetched by the CPU 3 is sent to the FPU 2 from the CPU 2 via the 32-bit data bus 34.

The microcomputer 1 deals, although the invention is not particularly so restricted, with a virtual address space specified by a 32-bit virtual address and a physical address space specified by a 29-bit physical address. The address conversion information for converting a virtual address into a physical address includes virtual page numbers and a corresponding physical page number. The address conversion table is formed in the external memory (not illustrated) of the microcomputer 1. Among the address conversion information of the address conversion table not illustrated, those items used recently are stored in the instruction TLB 40 and unified TLB 41. Such storing is controlled, for example, by the OS (Operating System) of the microcomputer 1.

The unified TLB 41 for data stores the address conversion information of data and instruction of 64 entries at a maximum. This unified TLB41 associatively retrieves the physical page number, for data fetching, corresponding to the virtual page number of the virtual address output by the CPU 3 to the data address bus 32 from the address conversion information and then converts the virtual address to a physical address.

The instruction TLB 40 for instruction stores the address conversion information only for an instruction of 4 entries at a maximum. Particularly, the entries held in the instruction TLB40 are considered as a part of the address conversion information of the instruction address held by the unified TLB41. That is, when it is found by the associative retrieval that there is no target address conversion information in the instruction TLB40, such address conversion information is supplied to the instruction TLB40 from the unified TLB41. This instruction TLB40 associatively retrieves, from the address conversion information, the physical page number corresponding to the virtual page number of the virtual address output by the CPU 3 to the instruction address bus 30 for the instruction fetch. When it is found as a result of retrieval that there is target address conversion information (TLB hit), the relevant virtual address is converted to a physical address using the address conversion information. When it is found as a result of retrieval that there is no target address conversion information (TLB miss), operation for obtaining the target address conversion information from the unified TLB41 is controlled by the cache TLB controller 44.

The data cache memory 43 receives, at the time of data fetching, the physical address converted by the unified TLB 41 and performs the associative retrieval of a cache entry depending on such physical address. When the retrieval result is obtained through a read hit, the data corresponding to the physical address is output to the data bus 33 or 35 from the cache line relating to the read hit. When the retrieval result is obtained through a read miss, the data of one cache line including the data relating to the miss is read from the external memory not illustrated via the bus controller 5 for updating the cache. Thereby, the data in relation to the cache miss is read to the bus 33 or 35. When the retrieval result is obtained through a write hit, data is written into the write hit entry when the cache operation mode is a copy back mode to set the dirty bit of the relevant entry. When a mismatching from the data of the external memory data is found by the dirty bit in the setting condition and the relevant dirty cache entry is sent out from the cache memory by the cache update operation, writing back is performed to the external memory. In the write through mode, data is written into the write hit entry and data is also written into the external memory. When the retrieval result is obtained through a write miss, a cache update is performed in the case of the copy back mode and the dirty bit is also set to update the tag address to write the data to the cache line. In the case of the write through mode, data writing is executed only to the external memory.

The instruction cache memory 42 receives, at the time of instruction fetching, the physical address converted by the instruction TLB40 and executes the associative retrieval of a cache entry depending on such physical address. When the retrieval result is obtained through a read hit, the instruction corresponding to the physical address is output to the instruction data bus 31 from the cache line related to the read hit. When the retrieval result is obtained through a read miss, the data of one cache line including the instruction related to the miss is read from the external memory not illustrated via the bus controller 5 for the cache update. Thereby, the instruction in relation to a miss is given to the CPU 3 via the instruction data bus 31.

The instruction TLB40, the unified TLB41 and the cache TLB controller 44 form the memory management unit. This memory management unit sets, respectively in the special right mode and user mode, the access right to the virtual address space for memory protection. For example, the address conversion information has protection key data for each virtual address page number. The protection key data is 2-bit data indicating the page access right with codes and is capable of setting any access right among the rights for reading only in the special right mode, reading and writing in the special right mode, reading in both special right mode and user mode, and reading and writing in both special right mode and user mode. When the actual access type violates the access right preset by the protection key data, a TLB protection violation exception is generated. When the TLB protection violation exception is generated, after the protection violation is solved, for example, by the exceptional process, the return instruction from the exceptional process is executed to execute again the interrupted ordinary processing instruction.

Memory protection by the memory management unit is effective for address conversion. Since the data transfer origination and data transfer destination addresses generated by DMAC8 are set as data by the CPU 3, memory protection is not effective for address conversion. Considering such a background, the DMAC8 individually realizes memory protection.

<<DMAC>>

Figure 2:
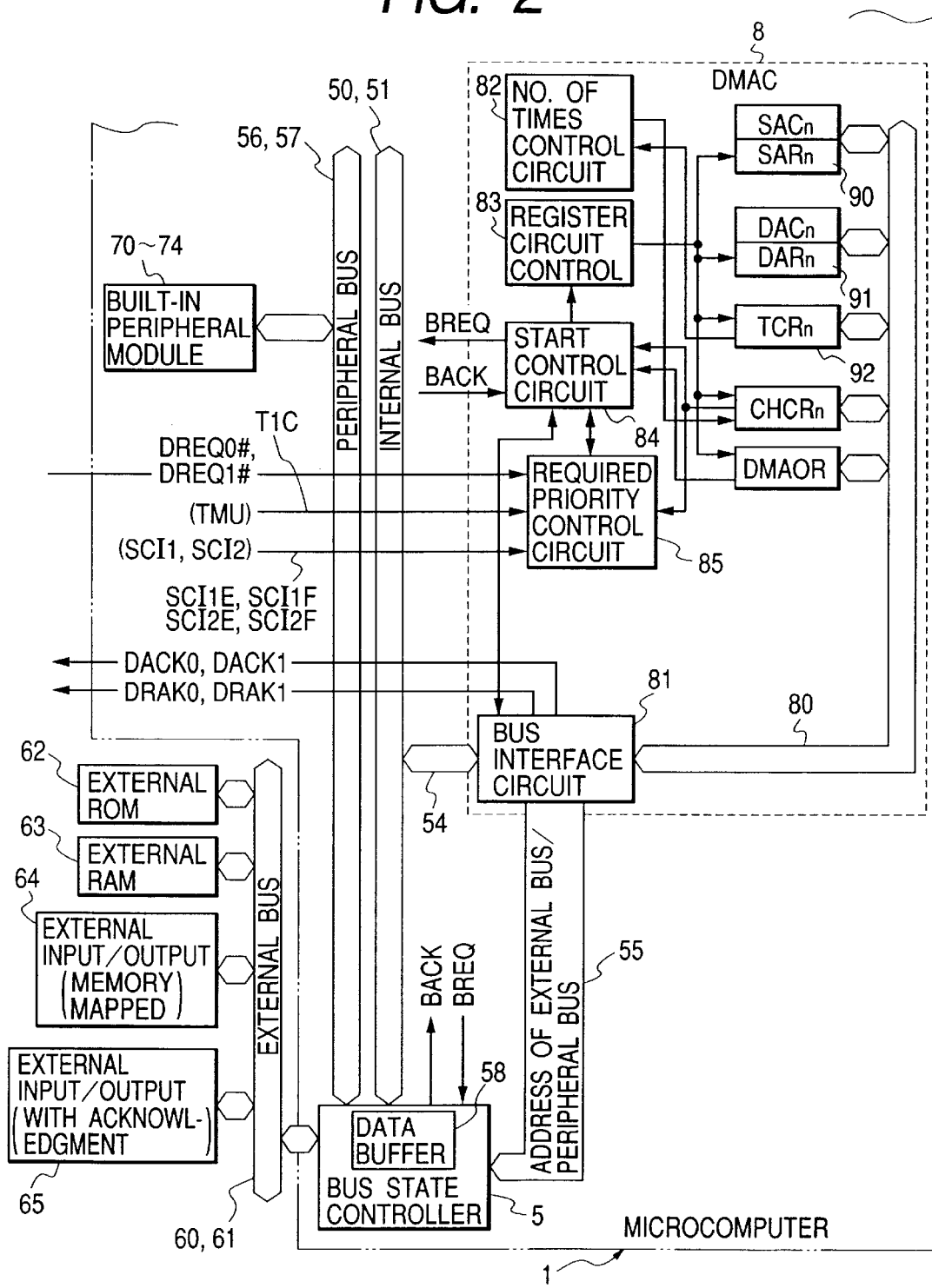
FIG. 2 is a block diagram showing the total structure of a DMAC.

FIG. 2 shows the overall structure of the DMAC8. In FIG. 2, the peripheral data bus 56 and the peripheral address bus 57 are generally called peripheral buses, while the address bus 50 and the data bus 51 are generally called internal buses and the external data bus 60 and external address bus 61 are generally called external buses. Moreover, the circuits 70 to 74 are generally called built-in peripheral modules (built-in peripheral circuits).

The external buses 60, 61 are typically connected, although the invention is not particularly so restricted, as external peripheral circuits, with an external ROM (Read Only Memory) 62 for storing programs and constant data, an external RAM (Random Access Memory) 63 used as the main memory, an external input/output circuit 64 forming a memory mapped I/O (Input/Output) and an external input/output circuit (I/O with acknowledgment) having a memory area which cannot allow external address designation, such as FIFO (First In First Out) buffer, etc.

The DMAC8 comprises n (for example, 4 (n=0, 1, 2, 3)) data transfer channels (data transfer channel 0 to data transfer channel 3), a source address register section 90 including source address registers SARn to which the transfer source addresses are set for each data transfer channel, a destination address register section 91 including destination address registers DARn to which the transfer destination addresses are set for each data transfer charnel, a transfer count register section 92 including transfer count registers TCRn for counting the number of times of transfer for each data transfer channel and channel control registers CHCRn to which the data transfer control modes for each data transfer channel are set. Here, a data transfer channel refers to a function unit for data transfer among memories, or to data transfer between the memory and peripheral circuits or to data transfer among the peripheral circuits. Moreover, the source address comparator sections SACn and destination address comparator sections DACn also form an address error detector section for each data transfer channel. In addition, an operation register DMAOR common to the data transfer channels is also provided.

The registers SARn, DARn, TCRn, CHCRn, DMAOR are connected in common to the bus 80 which is connected to the bus interface circuit 81. The bus interface circuit 731 is connected to the internal bus 51 via the data bus 54 and is also connected directly to the bus state controller 5 via the address bus 55. The data bus 54 is used for a read/write operation to check the initial setting and the setting contents of the registers SARn, DARn, TCRn, CHCRn, DMAOR. This read/write operation is executed by the CPU3 through the address conversion cache unit 4. The register selection signal is supplied through the internal bus 51 and the data bus 54. The address bus 55 is used in the data transfer operation by DMAC8 to supply the access address signal to the built-in peripheral circuits and external peripheral circuits via the bus state controller 5.

The DMAC 8 comprises, as a control circuit for data transfer control using a data transfer channel, a number of times control circuit 82, a register control circuit 83, a start control circuit 84 and a request priority control circuit 85. The request priority control circuit 85 determines, when a data transfer request is issued from inside or outside of the microcomputer 1, the transfer request source area by making reference to the channel control register CHCRn and also determines the data transfer channel to be started for response to such transfer request. Moreover, the request priority control circuit 85 also determines only one data transfer channel to be started depending on a predetermined priority when data transfer requests are competing. The request priority control circuit 85 also gives, upon determination of one data transfer channel for response to the data transfer request, certain information to the drive (start) control circuit 84. The drive control circuit 84 first requests the bus right by asserting the bus right request signal BREQ to the bus state controller 5. When the bus state controller 5 asserts the bus right acknowledgment signal BACK, the DMAC8 obtains the bus right. The start control circuit 84 causes the register control circuit 83 to control the output operation of the source register SARn and destination register DARn and also causes the bus interface circuit 81 to control the address output operation. Thereby, the DMAC8 executes data transfer control responding to the data transfer request via the bus state controller 5.

Figure 3:
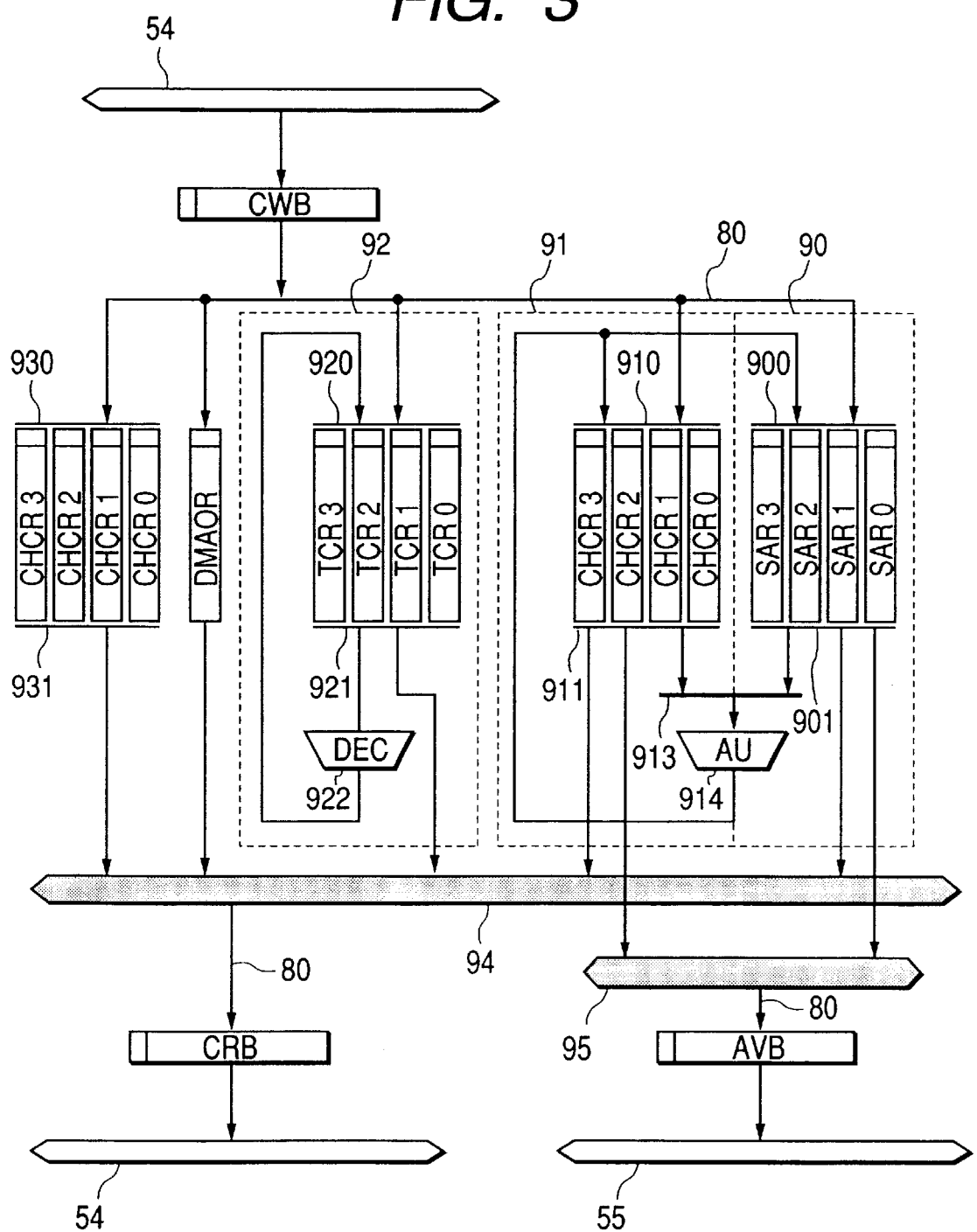
FIG. 3 is a block diagram showing details of a data transfer channel.

FIG. 3 shows details of a data transfer channel. A write buffer CWB, a read buffer CRB and an address output buffer AVB are included in the bus interface circuit 81.

The transfer count register section 92 has an input selector 920 and an output selector 921 for the transfer count registers TCR0 to TCR3 (TCRn) and also has a decrementer 922. To the transfer count registers TCR0 to TCR3 (TCRn), the number of times of transfer of the corresponding data transfer channel is initially set from the CPU3 via the input selector 920. The value of the transfer count register TCRn corresponding to the relevant data transfer channel for each transfer operation of the data transfer channel for which operation is selected is decremented one by one by the decrementer.

The source address register section 90 has an input selector 900 and an output selector 901, while the destination address register section 91 has an input selector 910 and an output selector 911. The source address register section 90 and destination address register 91 have a common selector 913 and an arithmetic unit 914. When the number of times of transfer is given as 2 or larger number, the address set in the source address registers SAR0 to SAR3 (SARn) and the destination address registers DAR0 to DAR3 (DARn) is considered as the leading address and this address is updated for each data transfer by the arithmetic unit 914.

The channel control registers CHCR0 to CHCR3 (CHCRn) have an input selector 930 and an output selector 931. In FIG. 3, the reference numeral 94 designates an input selector of the read buffer CRB. Numeral 95 designates an input selector of address output buffer AVB.

The selectors 900, 901, 910, 911, 920, 921, 930, 931, 94 and 95 are controlled in their selecting operation by the register control circuit 83 depending on the data transfer operation.

FIG. 4 shows a format of the channel control register CHCRn (CHCR0 to CHCR3). The channel control register CHCRn includes the respective information DE, RS0 to RS3, TE, DM0 to DM1, SM0 to SM1, TM, TS0 to TS2, IE, DS, RL, AN and AL. Among these pieces of information, each bit of DS, RL, AN and AL is made valid only in the data transfer channel 0 and data transfer channel 1. These bits are control data which are significant only in the external request mode and only the data transfer channels 0, 1 can be used in the external request mode.

As shown in FIG. 5, the channel enable bit DE is the control bit for determining whether or not operation of the corresponding data channel is possible. In the case of DE=0, operation of the corresponding channel is prohibited, and in the case of DE=1, operation of the corresponding channel is allowed.

The resource select information RS0 to RS3 is used to designate, with a plurality of bits, what is referred to herein as the combination mode of the data transfer requesting area assigned to the relevant data transfer channel for each data transfer channel, the data transfer source area responding to the data transfer request from the transfer requesting area and the data transfer destination. The combination modes designated by the resource select information are as shown in FIG. 6. The data transfer mode, namely whether it is the single address mode or dual address mode is determined uniquely by the combination mode. In the single address mode, DMAC8 executes an addressing operation only to any one of the data transfer source area or data transfer destination. In this mode, only one of the source address register SARn and the destination address register DARn is used. Such an operation mode is performed, for example, to execute data transfer between a relevant FIFO buffer and an memory responding to the data transfer request from the external peripheral circuit providing the FIFO buffer. In this way, the DMAC8 does not need to execute an addressing operation to the FIFO buffer. In the dual address mode, the DMAC8 executes an addressing operation to both the transfer source area and transfer destination.

FIG. 6 shows the combination mode corresponding to the data transfer mode supported by the DMAC8. That is, the data transfer request for the DMAC8 can roughly be classified into an external request, autorequest and request from the built-in peripheral circuits. An external request refers to a data transfer request to the DMAC8 from the external side of the microcomputer 1. This request is given by the transfer request signals DREQ0#, DREQ1# as illustrated in FIG. 2. Although the invention is not particularly so restricted, the external request is validated only by the data transfer channels 0, 1. When the transfer requests indicated by the transfer request signals DREQ0# and DREQ1# are accepted, the transfer acknowledgment signals DRAK0, DRAK1 are returned to the transfer request source area. The end of the data transfer operation responding to the transfer request signals DREQ0#, DREQ1# is returned to the transfer request source area by the bus interface circuit 81 sending the transfer end signals DACK0, DACK1.

The data transfer request from the built-in peripheral circuits of the microcomputer 1 is given, although the invention is not particularly so restricted, by an input capture interruption signal TIC output from the timer (TMU) 74, a transmitting data empty interruption transfer request signal SCI1E from the serial communication interface controller SCI1, a receiving data full interruption transfer request signal SCI1F from the serial communication interface controller SCI1, a transmitting data empty interruption transfer request signal SCI2E from the serial communication interface controller SCI2 and a receiving data full interruption transfer request signal SCI2F from the serial communication interface controller SCI2.

An autorequest refers to a transfer request in conjunction with the setting condition of the channel enable bit DE included in the channel control register CHCRn. That is, in the data transfer channel in which the autorequest is designated by the resource select information, data transfer is requested by setting the data transfer enable bit DE to "1".

The request priority control circuit 85 determines, when the data transfer request by the external request, autorequest and request from the built-in peripheral circuit is issued, the data transfer channel to respond to such a request source area from the setting consents of the resource select information RS0 to RS3 of the channel control register CHCRn. For example, when the input capture interruption signal TIC is asserted, the relevant data transfer channel which is determined for responding to the data transfer request by the input capture interruption signal TIC is a data transfer channel in which the resource select information RS3, RS2, RS1, RS0 is respectively set to 1, 1, 1, 0. Moreover, when the channel enable bit DE of the desired data transfer charnel is set, the relevant data transfer channel which is determined as the data transfer channel responding to the autorequest is a data transfer channel in which the resource select information RS3, RS2, RS1, RS0 of the data transfer channel is respectively set to 0, 1, 0, 0.

As shown in FIG. 7, the transfer end bit TE is set to "1" when the transfer matches the number of times of transfer preset in the transfer count register TCRn of the data transfer channel. That is, when the number of times control circuit 82 of FIG. 2 has detected that the value of the transfer count register TCRn of the corresponding data transfer channel has reached "0" as a result of operation of the decrementer 922 of FIG. 3, the relevant number of times control circuit 82 sets the transfer end bit TE of the corresponding data transfer channel to "1". When the drive control circuit 84 shown in FIG. 2 detects that the transfer end bit TE of the data transfer channel is set to "1", the bus request signal BREQ is negated. While the data transfer channel in which the transfer end bit TE is set to "1" is executing a data transfer operation in response to an external request, the bus interface circuit 81 asserts DACK0 or DACK1 to communicate the end of data transfer condition to the transfer request source area which has issued the external request.

The destination address mode information MDT, MD2 designates, as shown in FIG. 8, a fixing, increasing or reducing of the transfer destination address. The source address mode information SM0, SM1 designates, as shown in FIG. 9, a fixing, increasing or decreasing of the transfer destination address. The transmission size information designates a size of transfer data as shown in FIG. 10. The interruption enable bit IE designates, as shown in FIG. 11, whether or not interruption should be requested to the CPU3 when the number of times of transfer designated by the transfer count register TCRn has been completed.

The transmission mode bit TM designates, as shown in FIG. 12, whether the bus mode in the data transfer should be set to the cycle steal mode or the burst mode. When the burst mode is designated, the DMAC8 does not release the bus right until a transfer for the number of times designated by the transfer count register TCRn is completed. In the cycle steal mode, the bus right is released to the CPU3 for a constant period for each transfer operation.

FIG. 13 shows a format of the operation register DMAOR. This register DMAOR includes respective information PR0 to PR1, AK, NMIF, DME.

The priority mode information PR0, PR1 determines, as shown in FIG. 14, the priority of a data transfer channel for executing data transfer when the transfer request is issued simultaneously to a plurality of data transfer channels. In FIG. 14, CH0 to CH3 denote the data transfer channel 0 to data transfer channel 3. The request priority control circuit 85 shown in FIG. 2 gives the priority to the data transfer request to the data transfer channel having a higher priority depending on the priority mode information PR0, PR1 when the data transfer requests to a plurality of data transfer channels are competing on the occasion of judging which data transfer channel is to respond to the data transfer request. For example, in the case where the resource select information RS0 to RS3 of both data transfer channels CH0, CH1 designates that the input capture interruption is executed in the transfer request source area, when the input capture interruption signal TIC is asserted, data transfer is executed by any one data transfer channel to which a higher priority is set by the priority mode information PR0, PR1.

The address error flag AE indicates generation of an address error as shown in FIG. 15. The condition where there is no address error is considered as the data transfer permitting condition, while the condition where there is address error is considered as the data transfer prohibiting condition. Even during the data transfer operation, when the flag AE is set, the data transfer is interrupted even if any data transfer channel is operated. An address error occurring in the DMAC8 means, first, an address boundary error, and, second, a memory protection error. A boundary error is sometimes generated when the transmission size is defined by a factor other than a byte. The address error mode can be found as a mode where the least significant bit is logical value "1" (odd number address) when the address set to the source address register SARn and destination address register DARn is a word address, or as the mode where the lesser significant two bits are logical values "01", "10", "11" when the address is a long word address, or as the mode where the lesser significant three bits are logical values "001", "010", "011", "100", "101", "111" when the address is a quad word address, or as the mode where the lesser significant five bits are logical values "00001", "00010", "00011", "00100", . . . , "11100", "11101", "11110", "11111" when a 32-byte block transfer is executed. The memory protection error designates an address error when at least any one of the data transfer source address set to the source address register SARn and the data transfer destination address set to the destination address register DARn deviates from the combination mode of the data transfer source area and data transfer destination designated by the resource select information RS0 to RS3. This memory protection error will be explained later in detail.

An NMI flag NMIF indicates, as shown in FIG. 16, that an interruption signal disabling mask for the CPU3 (NMI) is input. The NMI is an interruption signal having a higher priority. When this signal is asserted for the CPU, DMAC8 intercepts the data transfer operation when the NMI flag NMIF is set in order to execute an interrupting process by the CPU3 with the highest priority.

A master enable bit DME is, as shown in FIG. 17, a drive permitting bit for the entire DMAC8. The relevant data transfer channel can be operated by setting the master enable bit DME and the channel enable bit DE of the channel control register CHCRn corresponding to the data transfer channel. When the master enable bit is cleared in the course of a data transfer, the data transfer is interrupted. Even in the case where the master enable bit DME is set, if the transfer end flat TE of the channel control register CHCRn is set, or the enable bit DE is cleared or the NMI flag NMIF or address error flag AE of the operation register DMAOR is set, the operation mode cannot be moved to the transfer permitting mode.

<<Memory Protection by DMAC>>

Figure 18:
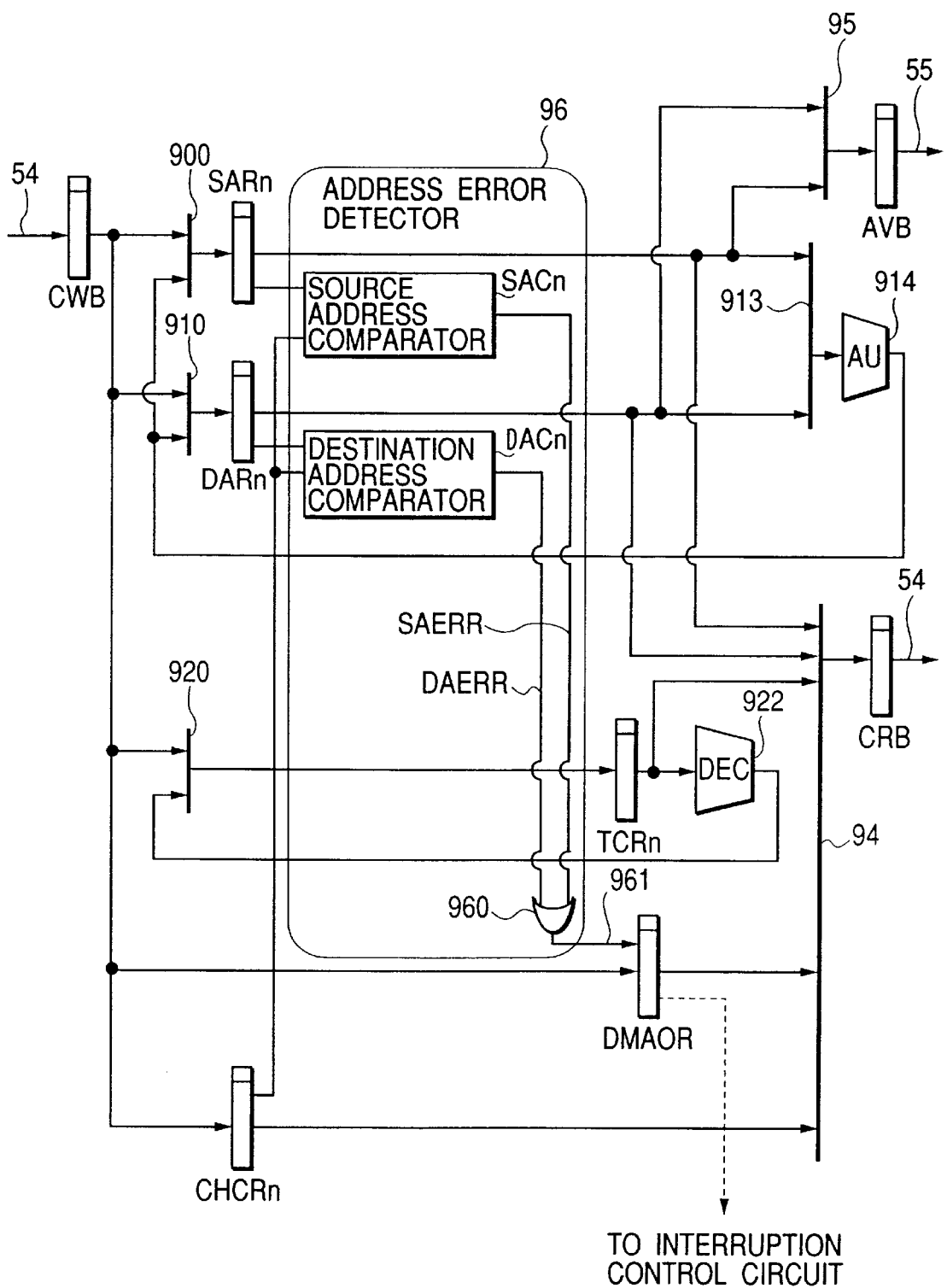
FIG. 18 is a circuit diagram showing a connecting relationship between an address error defector and a register for memory protection by a DMAC.

FIG. 18 shows details of the relationship between the address error detector section and the register section for memory protection.

The address error detector section 96 is formed of a source address comparator section SACn, a destination address comparator section DACn and a logical sum gate 960. The source address comparator section SACn and destination address comparator section DACn are respectively provided as a section pair for each data transfer channel. The source address comparator section SACn inputs the three bits SAR[28], SAR[27], SAR[26] from the most significant bits of the 29-bit physical address stored in the source address register SARn and the resource select information RS0 to RS3 of the channel control register CHCRn. The destination address comparator section DACn inputs the three bits DAR[28], DAR[27], DAR[26] from the most significant bits of the 29-bit physical address stored in the destination address register DARn and the resource select information RS0 to RS3 of the channel control register CHCRn. To the logical sum gate 960, an output of the source address comparator section SACn in the data transfer channel and an output of the destination address comparator section DACn are input. An output signal 961 of the logical sum gate 960 is reflected on the address error flag AE of the operation register DMAOR. When the address error flag AE is set, an interruption request for indicating an address error is issued to the interruption control circuit 71.

Figure 19:
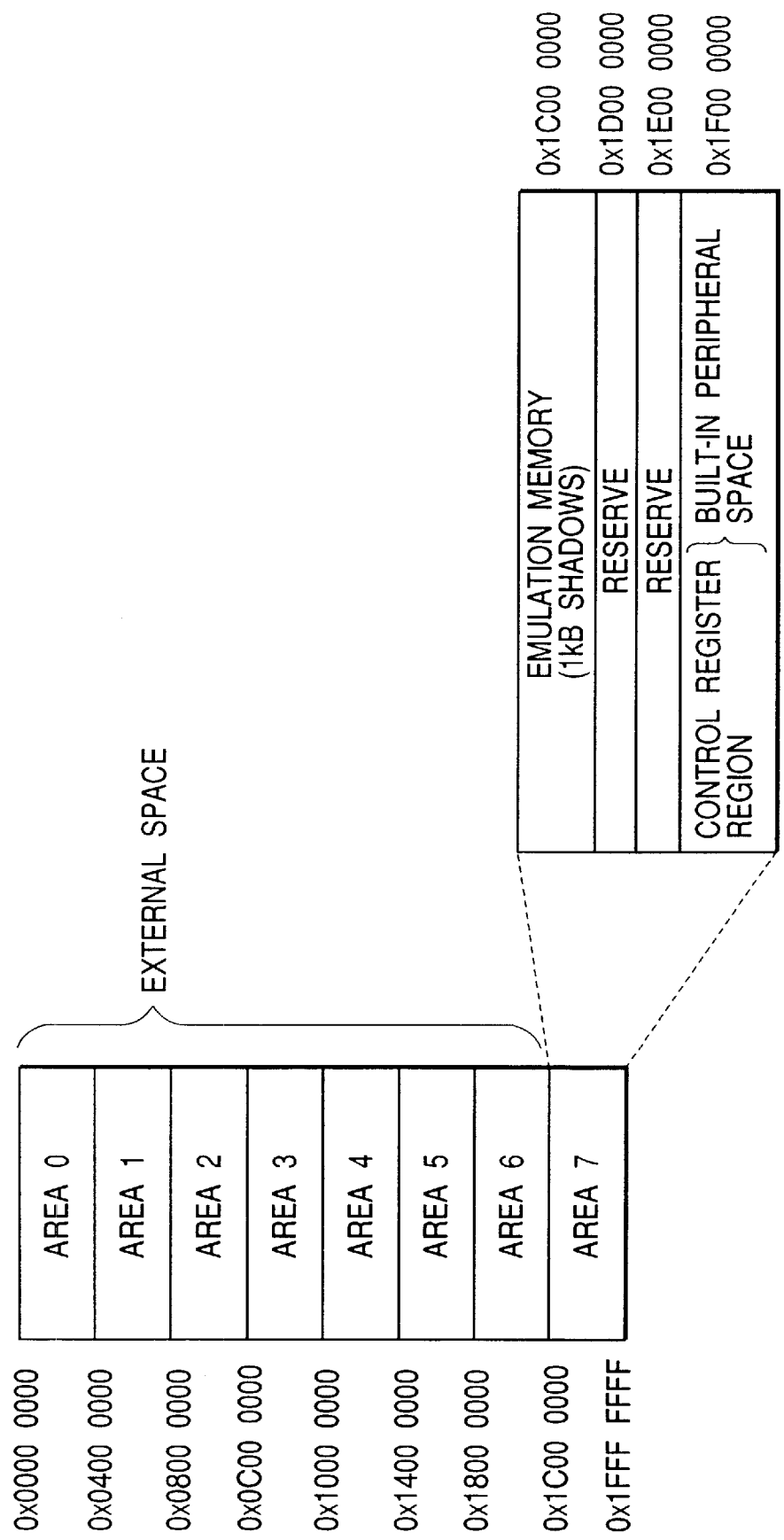
FIG. 19 is a diagram for explaining a physical address space which is administrated by the physical address of 29 bits by means of the microcomputer.

The physical address space accessed with the 29-bit physical address by the microcomputer 1 is, although the invention is not particularly so restricted, divided into the area 0 to area 7 as shown in FIG. 19. The area 0 to area 6 are assigned to the external address space (external space) of the microcomputer 1 and the area 7 is assigned to the internal address space (internal space) of the microcomputer 1. Particularly, 0x1F00 0000 to 0x1FFF FFFF (0x is a hexadecimal number) of the area 7 is defined as the control register space (built-in peripheral space) assigned to the built-in peripheral modules 70 to 74 of the microcomputer. Therefore, the source address comparator section SACn and destination address comparator section DACn can determine the areas of the source address and destination address by making reference to the three bits SAR[28] to SAR[26] on the most significant bit side of the source address, and three bits DAR[28] to DAR[26] on the most significant bit side of the destination address.

The source address comparator section SACn has the address error determination table of the source address shown in FIGS. 20A to 20C, while the destination address comparator section DACn has the address error determination table of the destination address shown in FIGS. 21A to 21C.

The address error determination table of the source address defines the mode where the address area in which the transfer source circuit specified by the resource select information RS0 to RS3 is not matched with the address area specified by the three bits SAR[28] to SAR[26] on the most significant bit side of the source address. A combination of the resource select information RS0 to RS3 and the three bits SAR[28] to SAR[26] on the most significant bit side of the source address when the SAERR is set to the logical value "1" in FIGS. 20A to 20C corresponds to the generation of an address error. For example, the address error mode of FIG. 20A, where RS3, RS2, RS1, RS0=0, 1, 0, 0, represents a data transfer in the dual address mode between external address spaces by autorequest as shown in FIG. 6. That is, the regular source address is located in the area 0 to area 6. In this case, when all of the three bits SAR[28] to SAR[26] on the most significant bit side of the source address have the logical value "1", it means that reference is to the area 7, which will generate an address error by memory protection violation.

In the same manner, the address error determination table of the destination address defines the mode where the address area in which the transfer destination circuit specified by the resource select information RS0 to RS3 is in conflict with the address area specified by the three bits DAR[28] to DAR[26] on the most significant bit side of the destination address. A combination of the resource select information RS0 to RS3 and the three bits DAR[28] to DAR[26] on the most significant bit side of the destination address when the DAERR is set to the logical value "1" in FIGS. 21A to 21C indicates the mode to generate an address error.

The signal DAERR indicates the determined result of the destination address comparator section DACn and the signal SAERR indicates the determination result of the source address comparator section SACn.

The memory protection error modes shown in FIGS. 20A to 20C and FIGS. 21A to 21C can be summarized as follow. That is, the address error mode representing a memory protection violation indicates the condition in which the transfer source address set to the address register SARn indicates one of the external peripheral circuits 62 to 65 when the data transfer source responding to the data transfer request is one of the built-in peripheral circuits 70 to 74, the condition in which the transfer source address set to the address register SARn indicates one of the internal peripheral circuits 70 to 74 when the data transfer source responding to the data transfer request is one of the external peripheral circuits 62 to 65, the condition in which the transfer destination address set to the address register DARn indicates one of the external peripheral circuits 62 to 65 when the data transfer destination responding to the data transfer request is one of the built-in peripheral circuits 70 to 74, and the condition in which the transfer destination address set to the address register DAR indicates one of the internal peripheral circuits 70 to 74 when the data transfer destination responding to the data transfer request is one of the external peripheral circuits 62 to 65.

Figure 22:
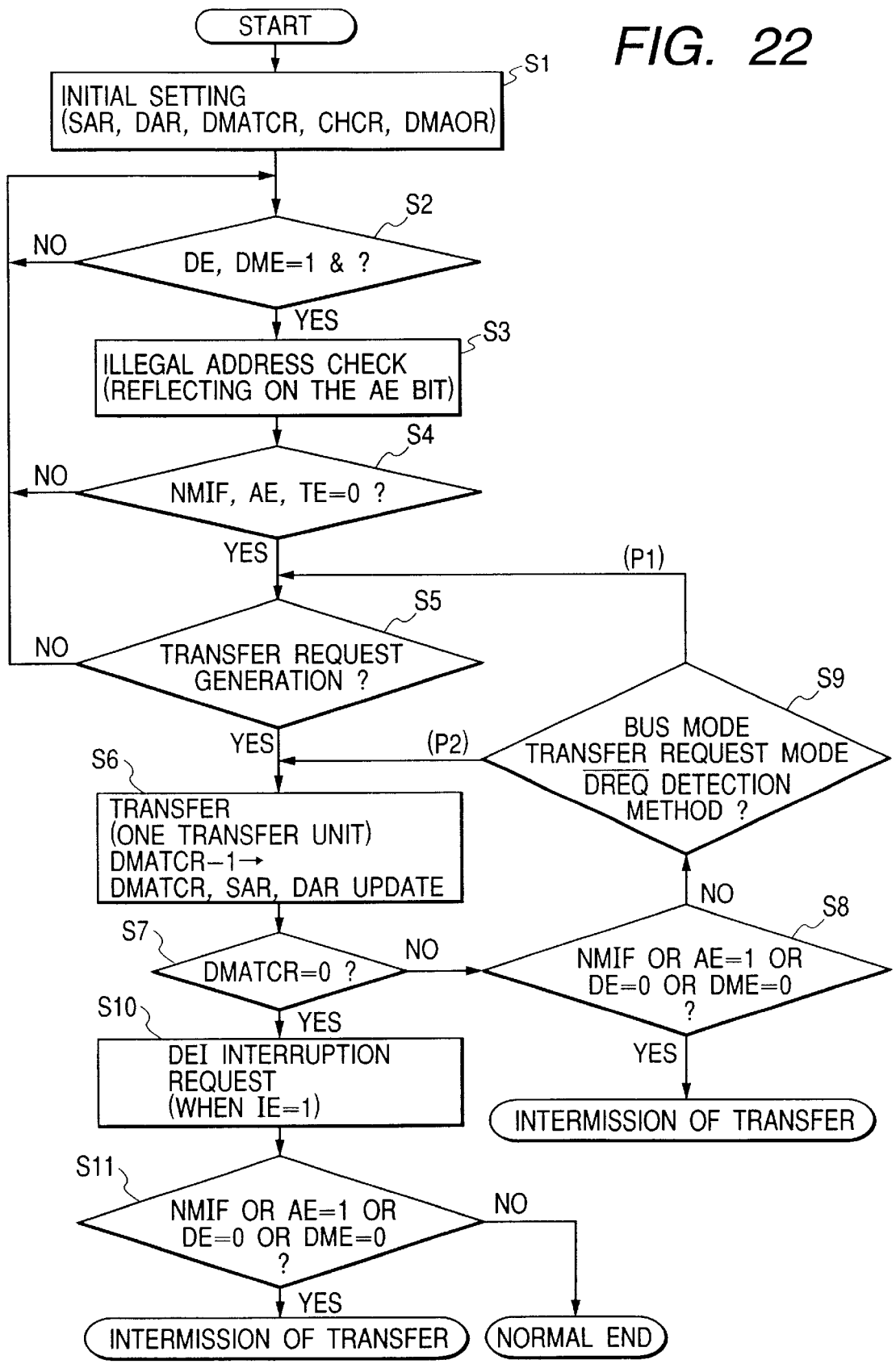
FIG. 22 is a flowchart of an example of DMAC operation.

FIG. 22 is a flowchart of the operation of DMAC8. First, DMAC8 is initialized by CPU3 (S1). That is, the target transfer conditions are set to the source address register SARn, destination address register DARn, transfer count register DMATCRn, channel control register CHCRn and operation register DMAOR. Thereby, the data transfer mode, the source address and the destination address are determined. After the initial setting, the drive control circuit 84 and the request priority control circuit 85 refer to the master enable bit DME and the channel enable bit DE of the channel control register CHCRn to determine whether or not it is in the transfer permitting condition (DME=1 and at least one data transfer channel DE=1).

In the case of a transfer permitting condition, an illegal address check is executed (S3). The illegal address check includes a memory protection error and boundary error check.

In the memory protection error check, whether or not the combination of the resource select information RS0 to RS3 of the channel control register CHCRn and the three bits on the most significant bit side of the source address register SARn matches with an access prohibiting mode (error mode of FIGS. 20A to 20C) is checked by the source address comparator section SACn in regard to the data transfer channel in the transfer permitting condition. In the same manner, whether or not the combination of the resource select information RS0 to RS3 of the channel control register CHCRn and the three bits on the most significant bit side of the destination address register DARn matches with an access prohibiting mode (error mode of FIGS. 21A to 21C) is checked by the destination address comparator section DACn in regard to the data transfer channel in the transfer permitting condition.

In the boundary error check, the transmission size information TS0 to TS1 of the channel control register CHCRn is compared with the source address register SARn and destination address register DARn in regard to the data transfer channel of the transfer permitting condition. If the transmission size is a size other than a byte size, whether the address is an odd number address or not is checked. When the address is an odd number address, it is defined as an address error.

When an illegal error is detected by the illegal address check, the address error flag AE is set to the logical value "1".

Here, it is determined that the NMI flag, address error flag AK, transfer end flag TE are all cleared to the logical value "0" (S4). If these are not cleared, the data transfer cannot be started again until the problem is eliminated.

When the NMI flag, address error flag AE, and transfer end flag TE are all cleared to the logical value "0", it is expected that a transfer request will be generated (S5).

When a transfer request is generated, the data transfer channel responding to the transfer request is determined. If a plurality of transfer requests are competing, the priority control is executed to perform data transfer in one transfer unit using one data transfer charnel (S6). The data size of one transfer unit is determined by the transmission size information TS0, TS1. When the autorequest mode is set by the resource select information, data transfer is automatically started by setting DE and DME to the logical value "1". For each data transfer, the value of the transfer count register TCRn of the data transfer channel in relation to data transfer is decremented one by one to update the values of the source address register SARn and destination address register DARn depending on the operation mode.

The value held in the transfer count register TCRn is referred to by the number of times control circuit 82 and the transfer operation is repeated until this value is decremented to 0 (S7). When the value of the transfer count register TCRn is set to 0, if 1 is set to the IE bit of the channel control register CHCRn, an interruption is generated in CPU3 (S10).

When the flag NMIF or AE is set to "1" during the data transfer or when DE or DME is cleared to "0", the transfer is interrupted (S8, S11). The interrupted data transfer is restarted after the reason for interruption is eliminated.

The data transfer operation, which is repeated until the value of the transfer count register TCRn is set to 0, is executed in different manners depending on whether the operating mode is the burst mode, the transfer request mode or the external request detecting method (S9). That is, when the cycle steal mode is designated or when the external request (DREQ0#, DREQ1#) is level-detected in the burst mode, the next data transfer is started after waiting for generation of the new transfer request as indicated by P1. When autorequest is designated in the burst mode or when the external request (DREQ0#, DREQl#) is edge-detected in the burst mode, the operation is shifted automatically to the next transfer operation.

Figure 23:
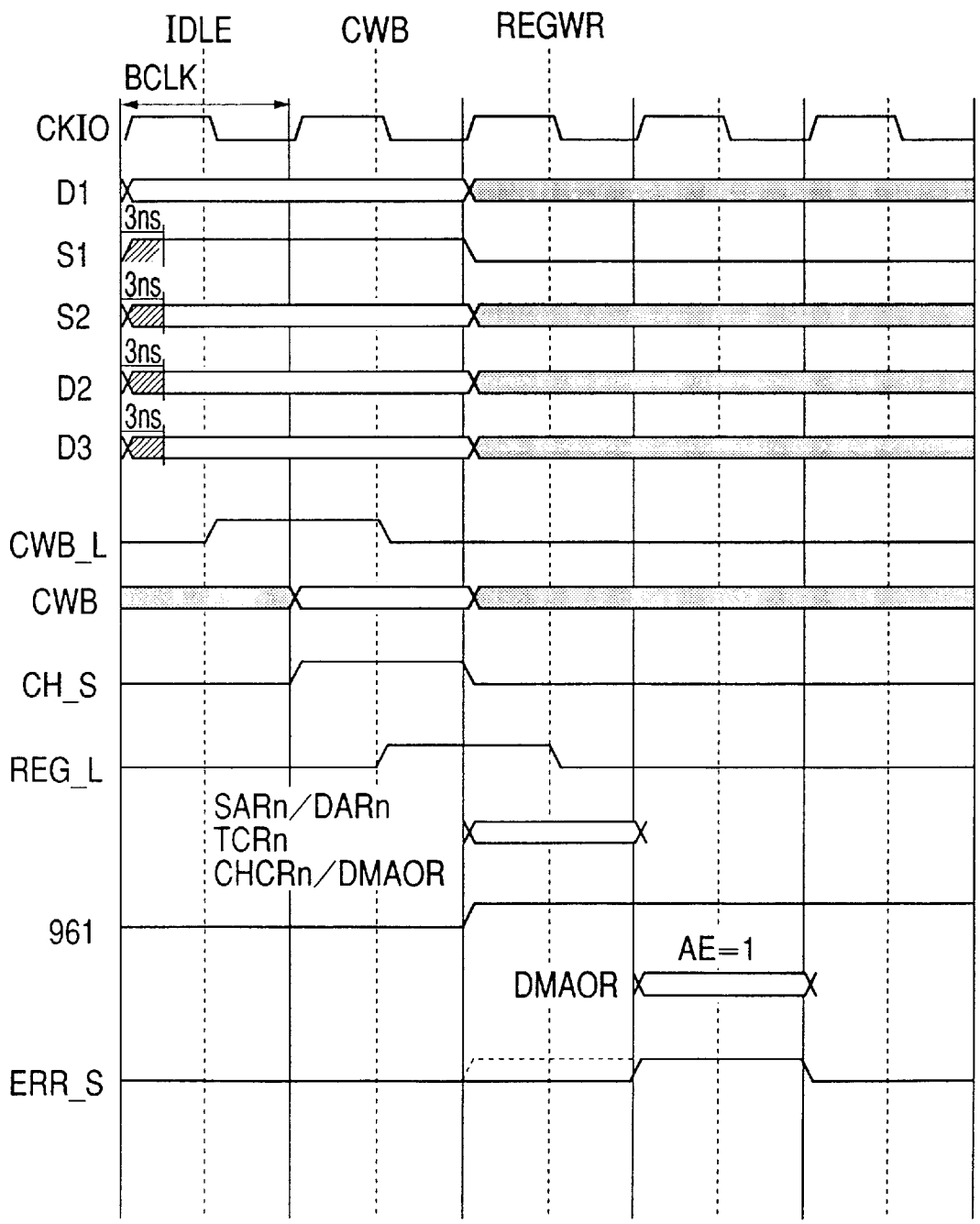
FIG. 23 is a timing chart as an example for DMA transfer control by memory protection.

FIG. 23 is a timing chart for controlling DMA transfer by memory protection. In FIG. 23, CKIO is the operation reference clock signal of the DMAC8. In FIG. 23, data D1 to D3 and control signals S1, S2 are supplied to the bus interface circuit 81 of the DMAC8 from CPU3 via the address conversion.cache unit 4. D1 is the information for freely selecting a register SARn, DARn, TCRn, CHCRn, DMAOR built in the DMAC8. S1 is the signal for selecting access to the DMAC8. S2 is a read/write signal. D2 is data size information for write-accessing the DMAC8. D3 is the information actually written into the register. These signals are valid for a two cycle period of the clock signal CLIO. CWB_L is the latch signal for the write buffer CWB. With this signal, the write buffer CWB latches the data D3. CH_S is the channel selection signal and REG_L is the register latch signal for the selected channel. The channel selection signal CH_S and register latch signal REG_L are generated by the bus interface circuit 81 depending on the data D1. Thereby, the data is written into the register selected by the channel selection signal CH_S and register latch signal REG_L.

For example, it is assumed here that the source address of the source address register SARn is written when the data of the channel control register CHCRn is already set. In this case, when the source address set to the source address register SARn for the resource select information RS0 to RS3 being set to the channel control register CHCRn is in an access prohibited area, the address error signal 961 is asserted and thereby "1" is set to the address error flag AE of the operation register DMAOR. This condition is communicated to the request priority control circuit 85 and drive control circuit 84 by the error signal ERR_S within the DMAC8 to control data transfer by the DMAC8. In this case, when both the channel enable bit DE of the channel control register CHCRn and the master enable bit DME of the operation register DMAOR are set to "1", "1" is set first to the address error flag AE. Moreover, when the single address mode is set by the resource select information RS0 to RS3, error detection to the address register (SARn or DARn) required for the data transfer is not performed for the boundary error and address error of the access prohibited area (the address register in this case can be used only as a buffer).

Figure 24:
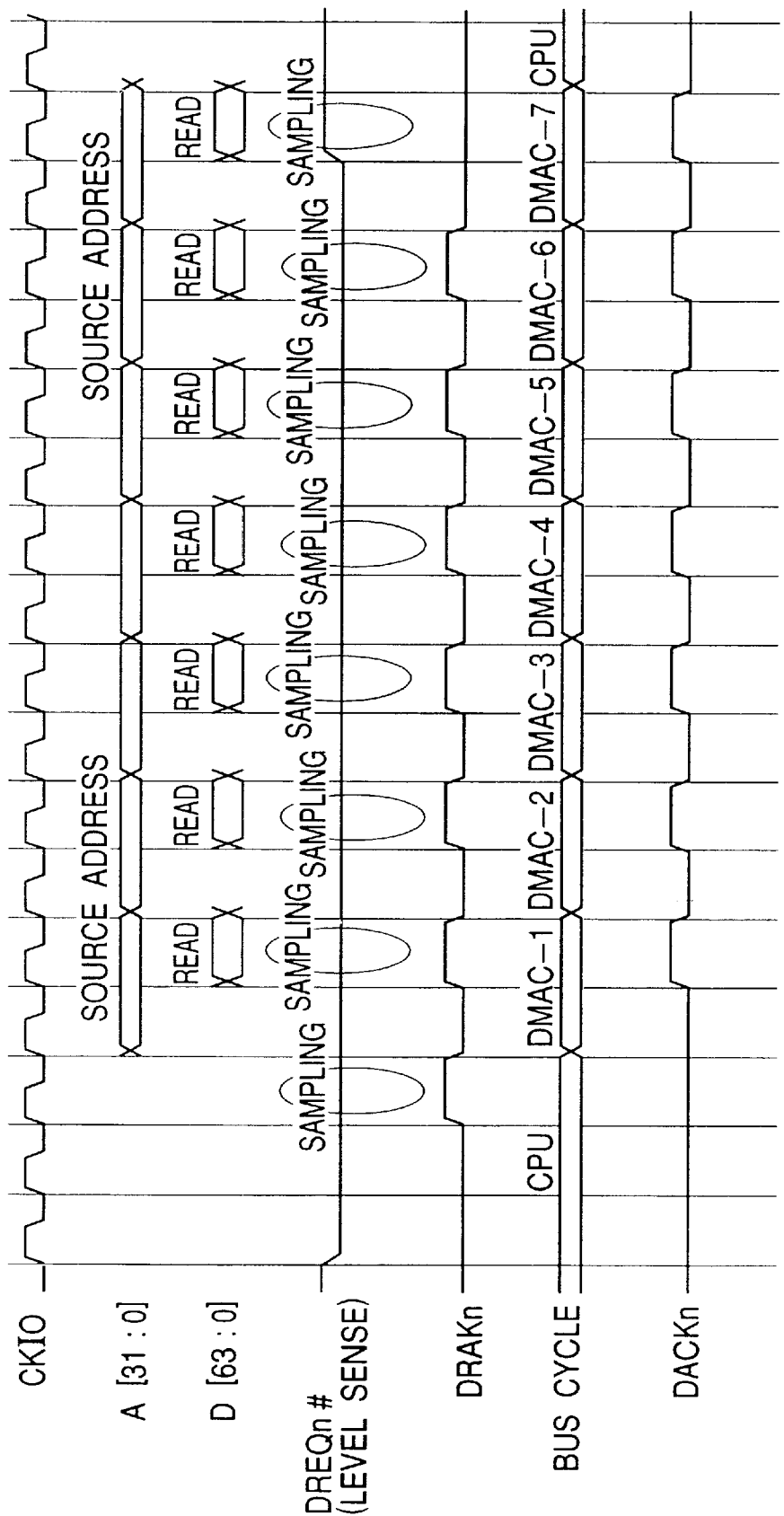
FIG. 24 is a timing chart as an example for executing data transfer after waiting for generation of a transfer request when an address error is not detected in such a case that a single address mode and burst mode are designated.

FIG. 24 is a timing chart for data transfer after generation of a transfer request when an address error is not detected. The timing shown in this figure corresponds to an example where the single address mode and burst mode are designated. The data transfer mode is for data transfer between external buses. Data transfer in this mode is repeated as many times as via P1 from step S9 of FIG. 22. The data transfer request source area is the transfer destination circuit, and the DMAC 8 outputs the source address for every transfer operation. Moreover, DREQn# is detected every time. Thereby, DRAKn and DACKn are also returned every time to the data transfer source area.

FIG. 25 is another timing chart for data transfer after regeneration of a transfer request when an address error is not detected. The timing shown in this figure indicates an example where the dual mode and burst mode are designated. The data transfer mode corresponds to data transfer between the external buses. The data transfer in this mode is repeated as many times as required via P1 from step S9 of FIG. 22. Since the dual address mode is designated, data at the source address is read and the data transfer operation for writing the data obtained by the reading operation to the destination address is repeated for a predetermined number of times. In this data transfer operation, the data read from the source address is temporarily stored in the data buffer 580f the bus controller 5 via the external bus, and the stored data is written into the destination address via the external bus.

FIG. 26 is another timing chart for data transfer after generation of the transfer request when an address error is not detected. The timing shown in this figure corresponds to an example where the dual address mode and the cycle steal mode are designated. The data transfer in this mode is repeated for a predetermined number of times via P1 from step S9 of FIG. 22. Since the dual address mode is designated, data at the source address is read and the data transfer operation for writing the data obtained by the read operation to the destination address is repeated a predetermined number of times. In this data transfer operation, the data reed from the source address is temporarily stored in the data buffer 58 of the bus controller 5 via the peripheral bus and the stored data is written into the destination address via the external bus. Moreover, in the cycle steal mode, DMAC8 abandons the bus right for a predetermined period in every data transfer cycle by the DMAC8.

<<Operation Effect by Memory Protection of DMAC>>

The operation effect of the memory protection performed by DMAC8 as explained above is as follows.

The data transfer application (combination of the data transfer source and transfer destination) of one data transfer channel formed of the address register SARn, DARn and control register CHCRn is determined by the resource select information RS0 to RS3. When at least one of the transfer destination address and transfer source address is deviated with reference to the data transfer application, the address error flag AE is set and start of the data transfer operation is controlled. Therefore, if the transfer source and transfer destination addresses to be set to the address register SARn, DARn are deviated due to a setting error, noise or uncontrolled operation of the system for the combination of the transfer source circuit and transfer destination circuit assigned to one data transfer channel, the data transfer operation is controlled. Moreover, if a setting error of the resource select information RS0 to RS3 and unwanted updating is generated, the data transfer operation is also controlled, as explained above, even when the transfer source address and transfer destination address to be set to the address registers SARn, DARn are normal.

As explained above, the combination mode of a transfer source and transfer destination which can transfer data with each other is previously defined depending on the value of the resource select information RS0 to RS3. The address error detector section 96 has address error judging logic depending on defined contents and also detects, on the basis of the logical structure thereof, an address error which disables data transfer control by the DMAC8 depending on the resource select information RS0 to RS3 of the control register CHCRn and the transfer source address and transfer destination address of the address registers SARn, DARn. Since data transfer can be started only when the resource select information RS0 to RS3 is matched with the setting information of both address registers SARn, DARn, higher reliability can be assured for the data transfer operation by the DMAC8. Moreover, the DMAC8 itself can control the data transfer operation for effecting memory protection by the DMAC8 so that a useless data transfer operation can be avoided.

The resource select information RS0 to RS3 used for memory protection is used to determine which data transfer channel should be used for a data transfer request. Therefore, individual settings of the control information are not required for function assignment of the data transfer channel and memory protection in the data transfer operation.

Since the priority is given, depending on the priority information PR0, PR1, to the data transfer request for the data transfer channel having a higher priority, when a plurality of data transfer channels are operated exclusively, the priority can be varied.

The microcomputer 1 realizes, at the time of address conversion by the memory management unit (40, 41, 44), memory protection for the address space managed by the CPU3, but such memory protection is effective for an access address. In this case, as explained above, when a setting contrary to the transfer mode of the resource select information RS0 to RS3 is made to the transfer destination address and transfer source address set as data by the CPU3 to the address registers SARn, DARn, the DMAC8 controls the drive of the data transfer in regard to the transfer destination address and transfer source address. Therefore, data protection of an access prohibited area can also be realized for the data transfer operation by the DMAC8, to which the memory protection of the memory management unit (40, 41, 44) is not directly available, and so the safety of the data processing system shown in FIG. 2 utilizing the microcomputer 1 can be enhanced. Since the safety of System operation can be more easily assured, the DMAC8 can be used to access the physical address space, and moreover the system can also be structured easily. In addition, the DMAC8 itself can control the data transfer operation to detect a memory protection violation, and a useless data transfer operation can be avoided. Accordingly, it is possible to realize a large improvement of the data processing efficiency by the data processing system and microcomputer 1.

The present invention has been explained practically on the basis of a preferred embodiment thereof, but the present invention is not restricted thereto and allows various changes or modifications within the scope of the claims.

For example, the data transfer controller may have a single data transfer charnel. Moreover, the mode for judging a memory protection violation depending on resource select information is not restricted to erroneous detection of the internal and external addresses of the microcomputer 1 explained above and can determine in detail the mode of the memory protection violation. It is only required to slightly complicate the judging logic by use of a judging table for detecting a memory protection violation, as explained with reference to FIGS. 20A to 20C and FIGS. 21A to 21C.

Moreover, when an output address signal of the DMAC is supplied to an instruction TLB or unified TLB in place of the bus state controller, the DMAC may also be utilized for the logical address space. Even in this case, the DMAC can also realize memory protection in a different meaning from the TLB.

In the above explanation, the present invention is applied to a one-chip microcomputer integrated on a single semiconductor substrate. But, the present invention is not limited thereto and a data transfer controller and microcomputer can be structured, for example, by means of a TTL circuit.

The typical effects disclosed in accordance with the present invention will be explained below.

That is, since data transfer can be started only when the setting information of the resource select information is matched with that of the address register, a higher reliability of memory protection for the data transfer operation by the data transfer controller can be obtained. Moreover, the data transfer controller itself can control the data transfer operation for avoiding a memory protection violation, and so a useless data transfer operation can also be avoided.

It is no longer required to individually set the control information to both the function assignment of the data transfer channel and memory protection in the data transfer by using in common the resource select information used for memory protection as the information for Judging which data transfer channel should be used for the data transfer request.

The data protection of the access prohibited area can also be realized for a data transfer operation by the data transfer controller to which the memory protection of the memory management unit is not directly available, and safe operation of the microcomputer or data processing system utilizing such data transfer controller can be enhanced. Since the safety of system operation can further be enhanced, the data transfer controller can be used easily for the physical address space and the system can also be structured easily. In addition, the data transfer controller itself can control the data transfer operation for avoiding a memory protection violation, and so a useless data transfer operation can be avoided. As a result, a large improvement of the data processing efficiency of data processing system and microcomputer can be realized.

What is claimed is:

1. A data processor comprising:
 a central processing unit;
 a bus coupled to said central processing unit; and
 a data transfer controller,
 wherein said data transfer controller comprises:
  an address register for setting a data transfer source address and a data destination address,
  a control register including a storing area for storing resource select information to designate with a plurality of bits a combination mode of the data transfer source and the data transfer destination,
  an address error detector section for detecting an illegal address access in which at least any one of the data transfer source address and the data transfer destination address set to said address register, when a data transfer request is generated, is in conflict with the combination mode of the data transfer source and the data transfer destination and is directed to a memory area where such an address is prohibited, and
  a control circuit for executing, when said illegal address access is not detected, data transfer control utilizing the information of said address register and control register and inhibiting, when said illegal address access is detected, the data transfer operation depending on said data transfer request.

2. A data processor according to claim 1, wherein said address error detector section further detects a boundary error in which at least one of the data transfer source address and the data transfer destination address is an odd number address or not, and wherein said control circuit depends on the data transfer operation on said data transfer request, when said address error detector section detects one of the data transfer source address and the data transfer destination address is an odd number address.

3. A data processing system comprising:

a data processor including a central processing unit and a data transfer controller;

at least one memory unit; and a bus coupled to said data processor and memory unit, wherein said data transfer controller comprises:

an address register for being set with a data transfer source address and a data transfer destination address in a memory area allocated in said memory unit by said central processing unit, an address error detector section for detecting an illegal address access in which at least any one of the data transfer source address and the data transfer destination address set to said address register is directed to a memory area where such an address is prohibited, when a data transfer request is generated, a first potion including a storage area for storing information for use in detecting said illegal address access by said address error detector section, and a control circuit for executing, when said illegal address access is not detected, data transfer control utilizing the information of said address register and said first potion and inhibiting, when said illegal address access is detected, the data transfer operation depending on said data transfer request.

4. A data processing system according to claim 3, wherein said memory unit has a protection area allocated in the memory area, and wherein said illegal address access includes an accessing to inside of said protection area.

5. A data processor according to claim 1, wherein said illegal address access including an access by use of an address value of said data transfer source address and/or said data transfer destination address and said address value does not correspond to a multiple of a predetermined transfer size.

* * * * *